United States Patent
Ikeno et al.

(10) Patent No.: US 7,308,329 B2
(45) Date of Patent: Dec. 11, 2007

(54) METHOD AND APPARATUS FOR INSPECTING SEMICONDUCTOR WAFER

(75) Inventors: Yasunori Ikeno, Cupertino, CA (US); Yasutoshi Kitahara, Ina (JP); Shunsuke Kurata, Kamiina-gun (JP); Yoshiaki Suge, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/318,423

(22) Filed: Dec. 22, 2005

(65) Prior Publication Data

US 2006/0161284 A1 Jul. 20, 2006

(30) Foreign Application Priority Data

Dec. 28, 2004 (JP) .......................... P2004-379694

(51) Int. Cl.
 *G06F 19/00* (2006.01)
(52) U.S. Cl. .................. 700/99; 700/100; 700/108
(58) Field of Classification Search .................. 700/99, 700/700, 108, 109, 110, 121, 100, 112, 218, 700/228; 438/14
See application file for complete search history.

(56) References Cited

U.S. PATENT DOCUMENTS

| | | | |
|---|---|---|---|
| 5,479,252 A * | 12/1995 | Worster et al. .......... 356/237.5 |
| 5,867,389 A | 2/1999 | Hamada et al. |
| 6,007,631 A * | 12/1999 | Prentice et al. ............. 118/669 |
| 6,203,617 B1 * | 3/2001 | Tanoue et al. .............. 118/695 |
| 6,270,634 B1 * | 8/2001 | Kumar et al. .......... 204/192.37 |
| 6,275,744 B1 * | 8/2001 | Yoshida ...................... 700/218 |
| 6,292,708 B1 * | 9/2001 | Allen et al. .................. 700/121 |
| 6,889,108 B2 * | 5/2005 | Tanaka et al. .............. 700/112 |
| 7,016,753 B2 * | 3/2006 | Yamazaki ................... 700/121 |
| 2003/0120371 A1 * | 6/2003 | Joma et al. ................. 700/100 |
| 2003/0130754 A1 * | 7/2003 | Tanaka et al. ................ 700/99 |

FOREIGN PATENT DOCUMENTS

| | | |
|---|---|---|
| JP | 09-139331 A | 5/1997 |
| JP | 10-270525 A | 10/1998 |
| JP | 11-186366 A | 7/1999 |

* cited by examiner

*Primary Examiner*—Leo Picard
*Assistant Examiner*—Charles Kasenge
(74) *Attorney, Agent, or Firm*—Frishauf, Holtz, Goodman & Chick, P.C.

(57) ABSTRACT

A substrate inspection apparatus includes a recipe preparation unit that batch-allocates a plurality of slots containing substrates of each type with a corresponding one of a plurality of original recipes to the each type, the plurality of original recipes corresponding to different types of substrates respectively, so as to prepare an actual recipe based on the plurality of original recipes, and to inspect the different types of substrates according to the actual recipe.

12 Claims, 10 Drawing Sheets

METHOD AND APPARATUS FOR INSPECTING SEMICONDUCTOR WAFER

BACKGROUND OF THE INVENTION

1. Field of the Invention

The present invention generally relates to a method and an apparatus for inspecting semiconductor wafers or substrates. More specifically, the present invention relates to a method and an apparatus for inspecting semiconductor wafers or substrates based on a recipe that defines a process for inspecting the wafers or substrates.

Priority is claimed on Japanese Patent Application No. 2004-379694, filed Dec. 28, 2004, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A semiconductor wafer inspection apparatus inspects a semiconductor wafer based on a recipe that defines what is to be inspected of the wafer, defines whether or not the inspection is made, and/or defines the conditions for inspecting the wafer. This recipe is previously determined before the wafer is processed. The predetermined recipe is allocated to a process unit such as a single cassette, a single wafer or other process unit. The term "cassette" generally means a case for storing and holding wafers. Notwithstanding, in the present application, the meaning of the term "cassette" includes not only the above-mentioned general meaning but also a unit for batch-processing of wafers. A single cassette may include a plurality of slots, each of which contains a single wafer. The single cassette may, for example, include 25 slots, each containing a single wafer.

The wafer inspection apparatus processes a cassette or a wafer, based on a recipe which has previously been allocated to this cassette or this wafer prior to commencement of the inspection process. A single recipe may, if any, be allocated commonly to all the wafers included in the single process unit such as a single cassette in order to perform a batch processing, in which all the wafers in the unit are processed in accordance with the common recipe. Alternatively, the single recipe may be allocated to a single wafer or a single slot that contains the single wafer in order to perform a single wafer processing, in which each wafer is processed in accordance with each allocated recipe.

In accordance with the batch processing, all the wafers belonging to the single process unit are subjected to the same process according to the common recipe. It is difficult for the batch processing to realize a wafer-sampling process, in which some of the wafers are extracted from the single cassette and subjected to the predetermined process, while the remainder of the wafers is not processed.

Limited production of a wide variety of products may be required, wherein different varieties of cassettes are used for manufacturing the products of different types. For example, a wide variety of cassettes are used for manufacturing a wide variety of products, provided that each cassette contains a small number of wafers. This increases the cost of wafer processing and the cost of the facility. In order to solve these disadvantages, the single wafer processing may be used. This processing allows some of the wafers contained in the single cassette to be processed in a recipe, and the remainder to be processed in a different recipe.

FIG. 8A is a view illustrating an example of a conventional allocation of a recipe to all slots belonging to a process unit in accordance with the conventional batch processing. A recipe "A" defines that processes 1 and 3 are carried out and a process 2 is not carried out. Another recipe "B" defines that the processes 1 and 2 are carried out, and the process 3 is not carried out. In accordance with one example of the conventional allocation of the recipe in the conventional batch processing, the recipe "B" is allocated to all the slots 1, 2, 3, 4, - - - n, so that all the slots 1, 2, 3, 4, - - - n are subjected to a batch processing based on the same recipe "B".

FIG. 8B is a view illustrating an example of the conventional allocation of different recipes to slots belonging to a process unit in accordance with the conventional single wafer processing. The recipe "A" defines that the processes 1 and 3 are carried out and the process 2 is not carried out. The recipe "B" defines that the processes 1 and 2 are carried out, and the process 3 is not carried out. In accordance with one example of the conventional allocation of the recipes in the conventional single wafer processing, the recipe "A" may be allocated to the slots 3 and n, and the recipe "B" may be allocated to the slots 1, 2 and 4, so that the slots 3 and "n" are subjected to the single wafer processing based on the recipe "A", and the slots 1, 2 and 4 are subjected to the single wafer processing based on the recipe "B".

Japanese Laid-Open Patent Publication No. 11-186366 discloses a conventional wafer processing apparatus that performs the single wafer processing.

SUMMARY OF THE INVENTION

In accordance with a first aspect of the present invention, a substrate inspection apparatus may include a recipe preparation unit, and a substrate inspection unit. The recipe preparation unit can advantageously be configured to obtain a plurality of original recipes which correspond to plural substrate types respectively. The plurality of original recipes correspond to a plurality of original process units respectively. The recipe preparation unit can advantageously be configured to allocate parts of the plurality of original recipes to a group of slots and prepare an actual recipe based on the plurality of original recipes. The group of slots belong to an actual process unit different from the original process units. The group of slots contain substrates of the plural substrate types. At least one of the plural substrate types include plural substrates. The plural substrate types of the plurality of original recipes correspond to the plural substrate types of the substrates contained in the group of slots. The substrate inspection unit can advantageously be configured to inspect substrates belonging to the actual process unit with reference to the actual recipe.

Preferably, the substrate inspection apparatus may further include a storage unit configured to store the plurality of original recipes. The storage unit can advantageously be functionally coupled to the recipe preparation unit, so that the recipe preparation unit reads out the plurality of original recipes from the storage unit.

Preferably, the recipe preparation unit can advantageously be configured to read out the plurality of original recipes from an external device.

Preferably, the recipe preparation unit can advantageously be configured to allocate the group of slots with a plurality of sampling inspections. The plurality of sampling inspections can advantageously be defined by the plurality of original recipes respectively. The plurality of sampling inspections correspond to the plural substrate types respectively.

Preferably, if the recipe preparation unit has allocated an empty slot with a part of one of the plurality of original recipes, the recipe preparation unit can advantageously be configured to re-allocate the part of one of the plurality of original recipes to a non-empty slot. The non-empty slot can be different from the empty slot and can have been allocated with a different part of the one of the plurality of original recipes.

Preferably, the recipe preparation unit can advantageously be configured to allocate the group of slots with the plurality of original recipes, in the sequence of numerical numbers assigned to the group of slots.

Preferably, the recipe preparation unit can advantageously be configured to allocate the group of slots with the plurality of original recipes, so that numerical numbers assigned to the group of slots of the actual recipe correspond to numerical numbers assigned to the group of slots of the plurality of original recipes.

Preferably, the recipe preparation unit can advantageously be configured to recognize a selected one of a plurality of allocation modes that have previously been given. The recipe preparation unit can advantageously be configured to automatically allocate the group of slots with the corresponding one of the plurality of original recipes in accordance with the selected one of the plurality of allocation modes.

Preferably, if the recipe preparation unit recognizes that the actual recipe does not satisfy at least one inspection condition that has previously been given, the recipe preparation unit can advantageously be configured to re-allocate the actual recipe, so that the actual recipe satisfies the at least one inspection condition.

Preferably, the at least one inspection condition may include a plurality of predetermined ratios in the number of substrates to be inspected to other substrates not to be inspected. Each of the plurality of predetermined ratios may correspond to one of different types of inspections.

Preferably, the at least one inspection condition may include a plurality of predetermined minimum numbers of substrates to be inspected. Each of the plurality of predetermined minimum numbers may correspond to one of different types of inspections.

In accordance with a second aspect of the present invention, a method of inspecting substrates may include the following processes. One of a plurality of allocation modes that have previously been given is selected. Different types of substrates and a relationship in correspondence between a plurality of slots and the different types of substrates are obtained. The plurality of slots may include sub-pluralities of slots that correspond to the different types of substrates, respectively. A plurality of original recipes that correspond to the different types of substrates, respectively is obtained. Each of the sub-pluralities of slots is batch-allocated with a corresponding one of the plurality of original recipes, so as to prepare an actual recipe based on the plurality of original recipes and to inspect the substrates according to the actual recipe.

In accordance with a third aspect of the present invention, a method of preparing an actual recipe to be used in processing substrates may include the following processes. A plurality of original recipes which correspond to plural substrate types respectively is obtained. The plurality of original recipes corresponds to a plurality of original process units respectively. Parts of the plurality of original recipes are allocated to a group of slots to prepare an actual recipe based on the plurality of original recipes. The group of slots belong to an actual process unit different from the original process units. The group of slots contain substrates of the plural substrate types. At least one of the plural substrate types includes plural substrates. The plural substrate types of the plurality of original recipes correspond to the plural substrate types of the substrates contained in the plurality of slots.

In accordance with a fourth aspect of the present invention, a substrate processing apparatus may include a recipe preparation unit, and a substrate processing unit. The recipe preparation unit can advantageously be configured to batch-allocate a plurality of slots containing substrates of each type with a corresponding one of a plurality of original recipes to the each type, so as to prepare an actual recipe based on the plurality of original recipes. The plurality of original recipes corresponds to different types of substrates respectively. At least one of the different types includes a plurality of substrates. The substrate processing unit can advantageously be configured to process the different types of substrates with reference to the actual recipe.

In accordance with a fifth aspect of the present invention, a method of processing substrates may include the following processes. A plurality of original recipes corresponding to different types of substrates respectively is obtained. A plurality of slots containing substrates of each type is batch-allocated with a corresponding one of the plurality of original recipes to the each type, so as to prepare an actual recipe based on the plurality of original recipes. At least one of the different types includes a plurality of substrates. The different types of substrates are processed with reference to the actual recipe.

In accordance with a sixth aspect of the present invention, a method of preparing an actual recipe to be used for processing substrates may include the following processes. A plurality of original recipes corresponding to different types of substrates respectively is obtained. A plurality of slots containing substrates of each type is batch-allocated with a corresponding one of the plurality of original recipes to the each type, so as to prepare the actual recipe based on the plurality of original recipes. At least one of the different types includes a plurality of substrates.

These and other features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected preferred embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
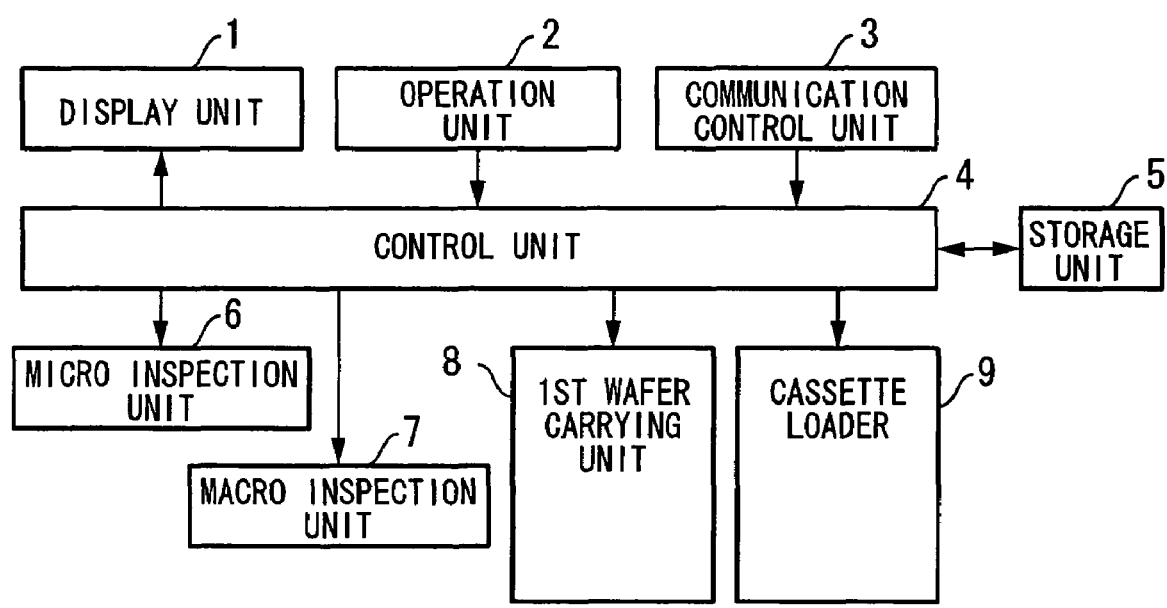
FIG. 1 is a block diagram illustrating a configuration of a wafer inspection apparatus in accordance with a first preferred embodiment of the present invention.
Figure 2:
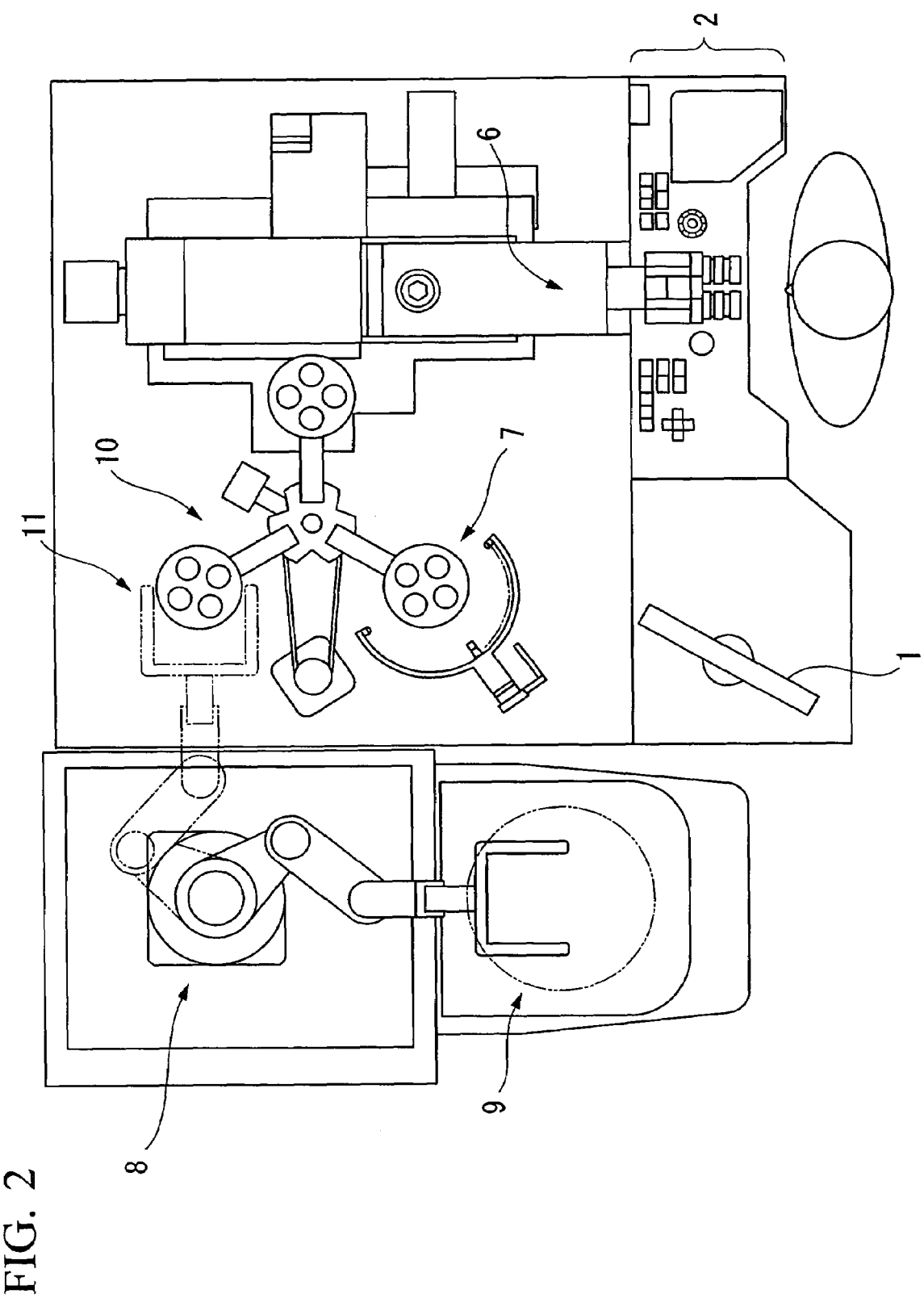
FIG. 2 is a plan view of a wafer inspection apparatus in accordance with a first preferred embodiment of the present invention.

FIG. 1 is a block diagram illustrating a configuration of a wafer inspection apparatus in accordance with a first preferred embodiment of the present invention. FIG. 2 is a plan view of the wafer inspection apparatus in accordance with a first preferred embodiment of the present invention. The wafer inspection apparatus is configured to perform macro and micro inspections of the wafer. The macro inspection is an inspection where a visual detection of macroscopic physical defects such as damage, spots and dust on the surface of a wafer is made by an inspector by the naked eye. The macro inspection may generally include a macro first-surface inspection and a macro second-surface inspection. The macro first-surface inspection is to inspect a surface of the wafer, and the macro second-surface inspection is to inspect an opposite surface of the wafer. The micro inspection is another inspection where local observation and highly accurate detection of microscopic physical defects on the surface of a wafer are made using a microscope. For example, a device for end-face inspection may be used for the micro inspection of the edge and periphery of the wafer.

The configuration and structure of the wafer inspection apparatus will be described with reference to FIGS. 1 and 2. The wafer inspection apparatus includes a display unit 1, an operation unit 2, a communication control unit 3, a control unit 4, a storage unit 5, a micro inspection unit 6, a macro inspection unit 7, a first wafer carrying unit 8 and a cassette loader 9. The micro inspection unit 6, the macro inspection unit 7, the first wafer carrying unit 8 and the cassette loader 9 are cooperated with each other under the control of the control unit 4, in order to enable the wafer inspection apparatus to perform micro and macro inspections of wafers. The display unit 1 and the operation unit 2 provide interfaces to a user.

The display unit 1 has a display screen for displaying images and characters. The display unit 1 is operatively coupled to the control unit 4 to display a variety of information such as recipes on the display screen, under the control of the control unit 4. The operation unit 2 may have switches and a joystick that are operated by an inspector or user. The joystick may be used to move the wafer during the macro inspection. The operation unit 2 also has operation buttons to be operated by the inspector to set one or more recipes for the macro and micro inspections.

The communication control unit 3 is connected to a host computer (not illustrated). The communication control unit 3 is also connected to the control unit 4 in order to control communication between the control unit 4 and the host computer.

The control unit 4 is connected to the display unit 1, the storage unit 5, the micro inspection unit 6, the macro inspection unit 7, the first wafer carrying unit 8 and the cassette loader 9, so that the control unit 4 controls the display unit 1, the storage unit 5, the micro inspection unit 6, the macro inspection unit 7, the first wafer carrying unit 8 and the cassette loader 9.

The control unit 4 also has a function of preparing an actual recipe based on the plural original recipes that have previously been given and allocated to the plural types of products. Each of the original recipes corresponds to each of the types of products. Namely, the original recipes are edited by the control unit 4 to prepare an actual recipe to be used in the actual inspection. The original recipes may be given to the control unit 4 by entering the recipe data into the operation unit 2 or by retrieving the recipe data via the communication control unit 3 from an external device such as a host computer (not illustrated). The term "actual recipe" means a recipe that is used in the actual inspection by the wafer inspection apparatus for inspecting the wafer. Namely, the actual recipe to be used in the actual inspection by the wafer inspection apparatus is prepared by the control unit 4 from data of the original recipes that have previously been given. The actual recipe prepared by the control unit 4 defines the contents of the actual inspection for each slot. Namely, the control unit 4 is configured to prepare an actual recipe based on the plural original recipes, thereby to define contents of an actual inspection for each slot. This means that the control unit 4 has a function of defining contents of an actual inspection for each slot, with reference to the plural original recipes that have previously been given and allocated to plural types of products.

Alternatively, it is possible as a modification for the control unit 4 to have another function of preparing an actual recipe based on additional information that is included in the original recipes. A typical example of the additional information may include, but is not limited to, a plurality of predetermined ratios in the number of wafers which are subject to the different types of actual inspections by the wafer inspection apparatus, and subject to other wafers which are free from the different types of actual inspections. The plural predetermined ratios correspond to the different types of actual inspections. Another typical example of the additional information may also include, but is not limited to, a plurality of predetermined minimum numbers of wafers that are subjected to the actual inspection by the wafer inspection apparatus. The plural predetermined minimum numbers correspond to the different types of the actual inspections.

The storage unit 5 stores information of recipes that define inspection contents and inspection conditions.

The micro inspection unit 6 is connected to the control unit 4 to perform a micro inspection with a magnification observation of the wafer under the control of the control unit 4. The micro inspection unit 6 has a microscope for the magnification observation of the wafer and a stage mechanism that moves the wafer to a position for the observation via the microscope.

The macro inspection unit 7 is connected to the control unit 4 to perform a macro inspection under the control of the control unit 4. The macro inspection unit 7 has a support mechanism that mechanically supports and moves a wafer, and an illumination mechanism that illuminates the wafer, so that the macro inspection unit 7 performs the macro inspection. The macro inspection unit 7 includes a macro inspection position where the macro inspection of the wafer is performed. The macro inspection unit 7 also includes an inspection reception position 11 where the macro inspection unit 7 receives a wafer for inspection from the first wafer carrying unit 8.

The first wafer carrying unit 8 is connected to the control unit 4 to carry a wafer to be inspected from the cassette loader 9 to the inspection reception position 11 of the macro inspection unit 7 or an inspected wafer from the inspection reception position 11 to the cassette loader 9 under the control of the control unit 4. The first wafer carrying unit 8 has a first carrying mechanism that carries a wafer to be inspected from the cassette loader 9 to the inspection reception position 11 of the macro inspection unit 7 or an inspected wafer from the inspection reception position 11 to the cassette loader 9 under the control of the control unit 4. The first carrying mechanism includes a carrying arm and a wafer holder. The first carrying mechanism moves the carrying arm to carry the wafer. The wafer holder holds the wafer by absorbing the wafer. The absorption may be a vacuum-absorption. The first wafer carrying unit 8 may advantageously be positioned adjacent to the cassette loader 9 and adjacent to the inspection reception position 11 of the macro inspection unit 7.

The wafer inspection apparatus further includes a second wafer carrying mechanism 10 that carries the wafer among three positions, namely, the inspection reception position 11 of the macro inspection unit 7, the macro inspection position of the macro inspection unit 7, and a position of the micro inspection unit 6. The second wafer carrying mechanism 10 may be located adjacent to the inspection reception position 11 of the macro inspection unit 7, adjacent to the macro inspection position of the macro inspection unit 7, and adjacent to the micro inspection unit 6. The second wafer carrying mechanism 10 may advantageously be located at a center of a circular area that encompasses the three positions, so that the second wafer carrying mechanism 10 carries the wafer to the three positions. For example, the second wafer carrying mechanism 10 may have a rotation axis and three-arms that extend radially from the rotation axis. The three-arms extend from the rotation axis to the inspection reception position 11 of the macro inspection unit 7, to the macro inspection position of the macro inspection unit 7, and to the micro inspection unit 6, namely. Rotation of the three-arms around the rotation axis carries the wafer among the inspection reception position 11 of the macro inspection unit 7, the macro inspection position of the macro inspection unit 7, and the micro inspection unit 6.

The cassette loader 9 is connected to the control unit 4 to load a cassette under the control of the control unit 4. The cassette loader 9 includes a loading mechanism that loads a cassette having a plurality of slots, each containing a wafer. The cassette loader 9 may optionally include an elevation mechanism that elevates the cassette at a pitch of slots, so as to adjust the level of a slot to a predetermined level for loading. Instead of providing the cassette loader 9 with the elevation mechanism, the first wafer carrying unit 8 may optionally include an elevation mechanism that elevates the first carrying mechanism having the carrying arm and the wafer holder, so as to adjust the level of the wafer holder to the level of a wafer for inspection contained in the slot of the cassette. Namely, either one of the cassette loader 9 or the first wafer carrying unit 8 may advantageously be provided with the elevation mechanism.

The cassette has a plurality of slots, each containing a wafer, so that the cassette contains or stores a plurality of wafers. The number of slots of the single cassette may be, but is not limited to, 13, 25 or 26. Each of the plural slots is assigned with an identification number. For example, numerical identification numbers such as "slot 1", "slot 2", "slot 3", - - - "slot 25" may be assigned sequentially from the bottom slot to the top slot.

The wafer inspection apparatus may operate as follows. A plurality of original recipes, each corresponding to each of the different products, has previously been prepared by an inspector before the actual inspection will be performed by the wafer inspection apparatus. The operation unit 2 is operated by an inspector for preparing data of plural original recipes. The operation unit 2 is operated by the inspector in order to supply operation signals to the control unit 4, so that the control unit 4 identifies operations to be performed, based on the operation signals. The operation unit 2 is operated by the inspector in order to send the control unit 4 editorial instructions to edit the data of the plural original recipes. The control unit 4 accesses to the storage unit 5 in order to read out, from the storage unit 5, the data of the original recipes that are subjected to the editions. Then, the control unit 4 produces display data based on the data of the original recipes, so as to supply the display data to the display unit 1.

The display unit 1 displays the original recipes based on the display data. The displayed recipes may include, but are not limited to, characters with or without images. The display unit 1 allows the inspector to confirm the displayed contents of the original recipes, and to operate the operation unit 2 so as to prepare and/or edit the data of the original recipes. The operation unit 2 supplies the control unit 4 with signals that represent the original recipes. The control unit 4 prepares an actual recipe based on the signals that were supplied from the operation unit 2, wherein the prepared actual recipe is to be used in the actual inspection. The actual inspection may include at least one macro inspection and/or at least one micro inspection. The control unit 4 instructs the storage unit 5 to store the data of the prepared actual recipe.

The operation unit 2 is operated by the inspector to enter instructions to start the actual inspection based on the prepared actual recipe. The operation unit 2 supplies the entered instructions to the control unit 4. Upon receipt of the instructions, the control unit 4 reads out the data of the actual recipe from the storage unit 5, in order to control the micro inspection unit 6, the macro inspection unit 7, the first wafer carrying unit 8 and the cassette loader 9, based on the read data of the actual recipe.

If the cassette loader 9 has the above-described elevation mechanism and the first wafer carrying unit 8 has no elevation mechanism, then the control unit 4 supplies the cassette loader 9 with a signal identifying a wafer that is subject to the inspection, so that the cassette loader 9 operates the elevation mechanism to elevate the cassette so as to adjust the level of a slot containing the wafer to a predetermined level.

If the cassette loader 9 has no elevation mechanism and the first wafer carrying unit 8 has the above-described elevation mechanism, then the control unit 4 supplies the first wafer carrying unit 8 with a signal identifying a wafer that is subject to the inspection, so that the first wafer carrying unit 8 operates the elevation mechanism to elevate the carrying arm and the wafer holder, so as to adjust the level of the wafer holder to a slot containing the wafer.

Subsequently, the control unit 4 supplies the first wafer carrying unit 8 with instructions to carry the wafer from the cassette loader 9 to the inspection reception position 11 of the macro inspection unit 7. In accordance with the instructions to carry the wafer, the first wafer carrying unit 8 operates the carrying arm and the wafer holder, so as to pick up a wafer which is subject to the inspection from the cassette in the cassette loader 9, and then move the wafer to the inspection reception position 11 of the macro inspection unit 7. The actual recipe may include both or either one of instructions to perform the macro inspection and other instructions to perform the micro inspection.

If the read actual recipe includes the instructions to perform the macro inspection, then the control unit 4 supplies the second wafer carrying mechanism 10 with instructions to carry the wafer from the inspection reception position 11 to the macro inspection position of the macro inspection unit 7. Upon receipt of the instructions to carry the wafer, the second wafer carrying mechanism 10 rotates around the rotation axis so as to carry the wafer from the inspection reception position 11 to the macro inspection position of the macro inspection unit 7. The macro inspection unit 7 receives the wafer from the second wafer carrying mechanism 10, and performs the macro inspection of the wafer based on the actual recipe.

After the macro inspection is completed, the control unit 4 supplies the second wafer carrying mechanism 10 with instructions to carry the macro-inspected wafer from the macro inspection position of the macro inspection unit 7 to the inspection reception position 11. In accordance with the instructions to carry the macro-inspected wafer, the second wafer carrying mechanism 10 rotates around the rotation axis so as to carry the wafer from the macro inspection position of the macro inspection unit 7 to the inspection reception position 11. The control unit 4 supplies the first wafer carrying unit 8 with instructions to carry the macro-inspected wafer from the inspection reception position 11 of the macro inspection unit 7 to the cassette loader 9. In accordance with the instructions to carry the macro-inspected wafer, the first wafer carrying unit 8 operates the carrying arm and the wafer holder, so as to move the wafer to the cassette loader 9 and store the inspected wafer into the cassette in the cassette loader 9.

If the actual recipe includes both the instructions to perform the macro inspection and the instructions to subsequently perform the micro inspection, the control unit 4 supplies the second wafer carrying mechanism 10 with instructions to carry the wafer from the inspection reception position 11 to the macro inspection position. Upon receipt of the instructions to carry the wafer, the second wafer carrying mechanism 10 rotates around the rotation axis, so as to carry the wafer from the inspection reception position 11 to the macro inspection position of the macro inspection unit 7. The macro inspection unit 7 receives the wafer from the second wafer carrying mechanism 10, and performs the macro inspection of the wafer.

After the macro inspection is completed, the control unit 4 supplies the second wafer carrying mechanism 10 with instructions to carry the wafer from the macro inspection position of the macro inspection unit 7 to the micro inspection unit 6. Upon receipt of the instructions to carry the wafer, the second wafer carrying mechanism 10 rotates around the rotation axis so as to carry the wafer from the macro inspection position of the macro inspection unit 7 to the micro inspection unit 6. The micro inspection unit 6 receives the wafer from the second wafer carrying mechanism 10, and performs the micro inspection of the wafer based on the actual recipe.

After the micro inspection is completed, the control unit 4 supplies the second wafer carrying mechanism 10 with instructions to carry the micro-inspected wafer from the micro inspection unit 6 to the inspection reception position 11. In accordance with the instructions to carry the micro-inspected wafer, the second wafer carrying mechanism 10 rotates around the rotation axis so as to carry the wafer from the micro inspection unit 6 to the inspection reception position 11. The control unit 4 supplies the first wafer carrying unit 8 with instructions to carry the micro-inspected wafer from the inspection reception position 11 to the cassette loader 9. In accordance with the instructions to carry the micro-inspected wafer, the first wafer carrying unit 8 operates the carrying arm and the wafer holder, so as to move the wafer to the cassette loader 9 and store the inspected wafer into the cassette in the cassette loader 9.

If the read actual recipe includes the instructions to perform the micro inspection, then the control unit 4 supplies the second wafer carrying mechanism 10 with instructions to carry the wafer from the inspection reception position 11 to the micro inspection unit 6. Upon receipt of the instructions to carry the wafer, the second wafer carrying mechanism 10 rotates around the rotation axis so as to carry the wafer from the inspection reception position 11 to the micro inspection unit 6. The micro inspection unit 6 receives the wafer from the second wafer carrying mechanism 10, and performs the micro inspection of the wafer based on the recipe under the control of the control unit 4.

After the micro inspection is completed, the control unit 4 supplies the second wafer carrying mechanism 10 with instructions to carry the micro-inspected wafer from the micro inspection unit 6 to the inspection reception position 11. In accordance with the instructions to carry the micro-inspected wafer, the second wafer carrying mechanism 10 rotates around the rotation axis so as to carry the wafer from the micro inspection unit 6 to the inspection reception position 11. The control unit 4 supplies the first wafer carrying unit 8 with instructions to carry the micro-inspected wafer from the inspection reception position 11 to the cassette loader 9. In accordance with the instructions to carry the micro-inspected wafer, the first wafer carrying unit 8 operates the carrying arm and the wafer holder, so as to move the wafer to the cassette loader 9 and store the inspected wafer into the cassette in the cassette loader 9.

The above-described operation will be repeated for all wafers stored in the cassette.

Figure 3A:
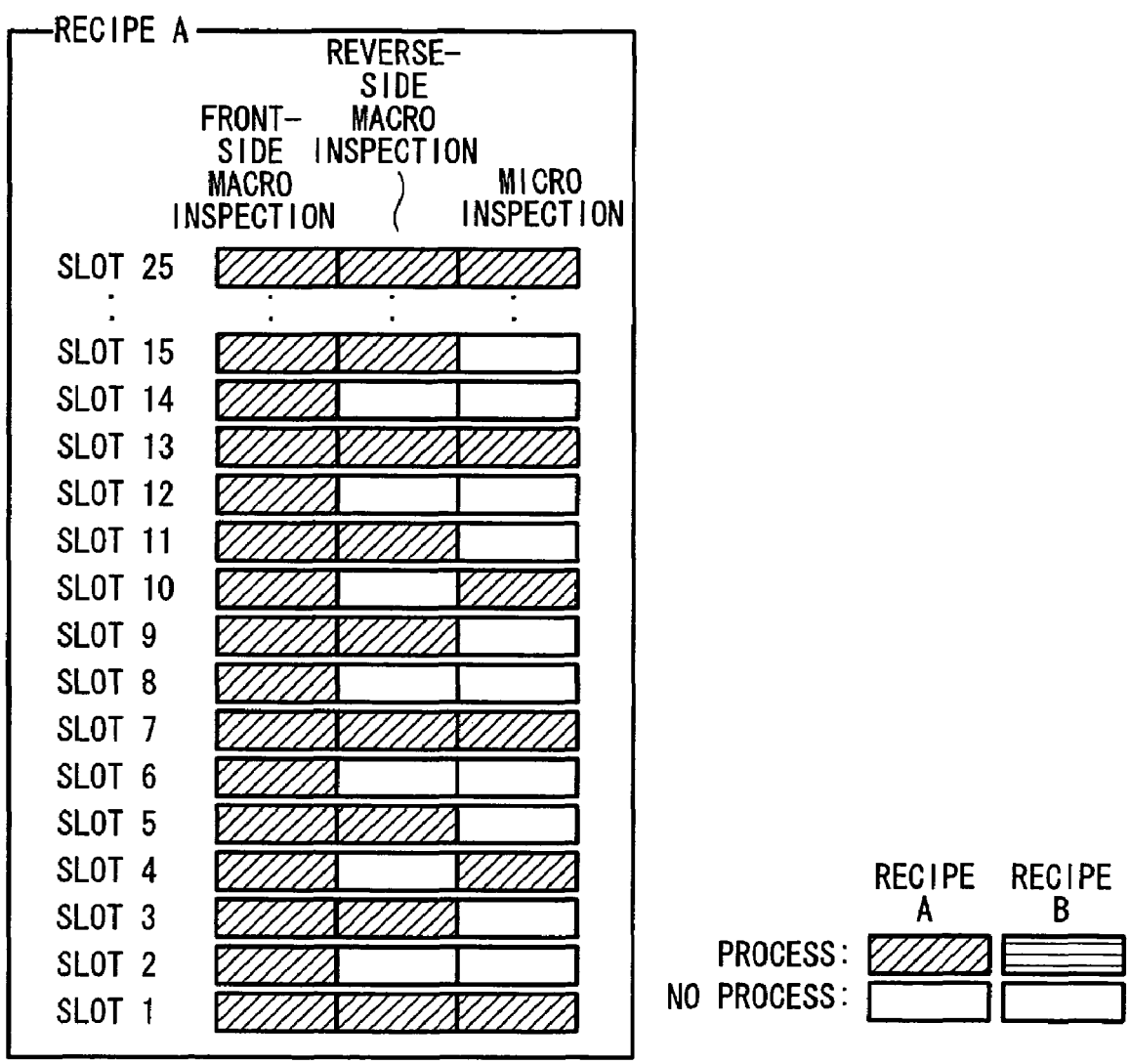
FIG. 3A is a view showing a recipe "A" for producing a product "A" with a first preferred embodiment of the present invention.
Figure 3B:
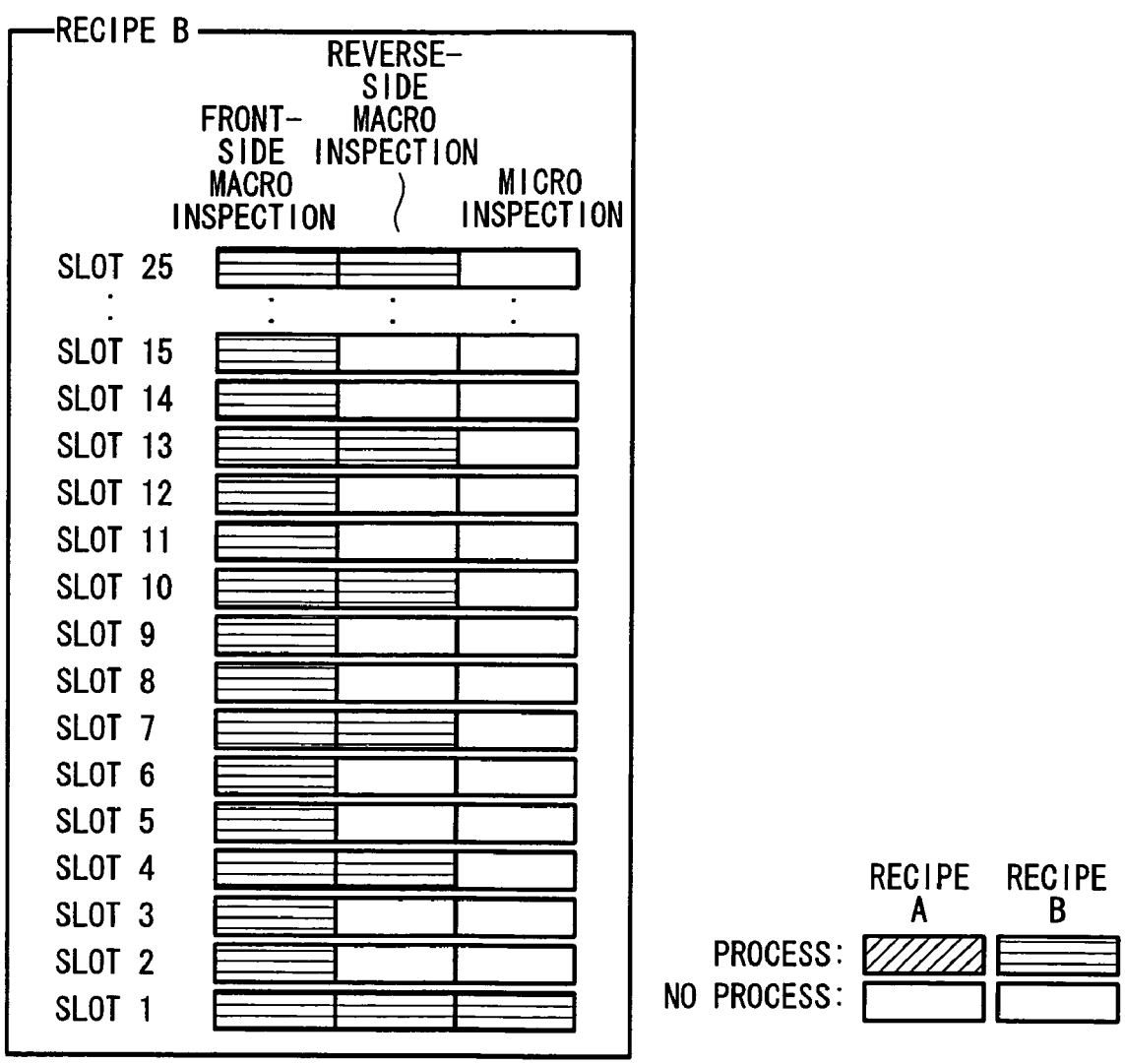
FIG. 3B is a view showing a recipe "B" for producing a product "B" with a first preferred embodiment of the present invention.

The contents of the original recipes will hereinafter be described with reference to the drawings. FIG. 3A is a view showing a first original recipe "A" for a first type of product "A". FIG. 3B is a view showing a second original recipe "B" for a second type of product "B". The original recipe "A" and the original recipe "B" have previously been prepared by the inspector and stored in the storage unit 5. As shown in FIGS. 3A and 3B, each of the original recipes "A" and "B" defines plural different types of inspection of a wafer. The first type of inspection is to macroscopically inspect a front side of the wafer. This first type of inspection will hereinafter be referred to as "front-side macro inspection". The second type of inspection is to macroscopically inspect a reverse side of the wafer. This second type of inspection will hereinafter be referred to as "reverse-side macro inspection". The third type of inspection is to microscopically inspect surfaces of the wafer. This third type of inspection will hereinafter be referred to as "micro inspection".

As shown in FIGS. 3A and 3B, each of the original recipes "A" and "B" defines whether or not each of the front-side macro inspection, the reverse-side macro inspection and the micro inspection should be carried out for each of twenty-five slots that belongs to a single cassette. For example, the original recipe "A" defines that, for each of wafers of the slots 1, 7, 13, 19, 25, all of the front-side macro inspection, the reverse-side macro inspection and the micro inspection are to be carried out. The original recipe "A" defines that, for each of wafers of the slots 2, 6, 8, 12, 14, 18, 20, 24, only the front-side macro inspection is to be carried out, and the reverse-side macro inspection and the micro inspection are not to be carried out. The original recipe "A" defines that, for each of wafers of the slots 3, 5, 9, 11, 15, 17, 21, 23, the front-side macro inspection and the reverse-side macro inspection are to be carried out, and the micro inspection is not to be carried out. The original recipe "A" defines that, for each of wafers of the slots 4, 10, 16, 22, the front-side macro inspection and the micro inspection are to be carried out, and the reverse-side macro inspection is not to be carried out.

The original recipe "B" defines that, for a wafer of the slot 1, all the front-side macro inspection, the reverse-side macro inspection and the micro inspection are to be carried out. The original recipe "B" defines that, for each of wafers of the slots 2, 3, 5, 6, 8, 9, 11, 12, 14, 15, 17, 18, 20, 21, 23, 24, only the front-side macro inspection is to be carried out, and the reverse-side macro inspection and the micro inspection are not to be carried out. The original recipe "B" defines that, for each of wafers of the slots 4, 7, 10, 13, 16, 19, 22, 25 the front-side macro inspection and the reverse-side macro inspection are to be carried out, and the micro inspection is not to be carried out.

A single original recipe is prepared and allocated to each type of the products. Each original recipe, therefore, corresponds to each of the different types of products. Namely, the number of different original recipes is the same as the number of different types of the products. In order to simplify the descriptions, it will be assumed that only two types of products are produced and thus the two original recipes "A" and "B" are prepared.

Each of the original recipes may optionally include additional information to the instructions to perform the front-side macro inspection, the instructions to perform the reverse-side macro inspection and the instructions to perform the micro inspection. Typical examples of the additional information may include, but are not limited to, conditions for macro inspection such as the intensity and the wavelength of illumination light, and other conditions for micro inspection such as the magnification of the microscope and the position of inspection over the wafer.

In accordance with both the original recipes "A" and "B, all wafers of all the slots 1 to 25 are subjected to the front-side macro inspection. In accordance with the original recipe "A" or "B", only wafers of slots predetermined by the recipe "A" or "B" are subjected to the reverse-side macro inspection. For example, in accordance with the recipe "A", wafers of the odd number slots 1, 3, 5, 7, - - -, 25 are subjected to the reverse-side macro inspection. In accordance with the original recipe "B", wafers of every third slot 1, 4, 7, 10, - - -, 25 are subjected to the reverse-side macro inspection. In accordance with the original recipe "A" or "B", only wafers of slots predetermined based on the original recipe "A" or "B" are selectively subjected to the micro inspection. For example, in accordance with the original recipe "A", wafers of every third slot 1, 4, 7, 10, - - -, 25 are subjected to the micro inspection. In accordance with the original recipe "B", only a wafer of the slot 1 is subjected to the micro inspection. Each of the original recipes may optionally include a predetermined ratio in the number of wafers, which are subjected to the inspection to other wafers which are free from the inspection. Also, each of the original recipes may optionally include a predetermined minimum number of wafers to be inspected.

The original recipes may be prepared by operation of entering the recipe data into the operation unit 2. Alternatively, the original recipe may also be prepared by retrieving data of the original recipe via the communication control unit 3 from an external device such as a host computer (not illustrated). In either case, the control unit 4 performs the above-described function of preparing an actual recipe, based on both the original recipes "A" and "B" that have previously been prepared. Namely, the control unit 4 edits the original recipes "A" and "B" to prepare the actual recipe. The actual recipe is to be used in the actual inspection of the wafer by the wafer inspection apparatus.

Alternatively, it is possible as a modification for the control unit 4 to prepare an actual recipe based on additional information included in the plural original recipes that have been previously given. Namely, the control unit 4 may edit the control unit 4 based on the additional information to prepare the actual recipe. For example, the control unit 4 prepares an actual recipe based on a plurality of predetermined ratios in the number of wafers which are subjected to the inspection, to other wafers which are free from the inspection, and/or a plurality of predetermined minimum numbers of wafers to be inspected. The plural predetermined ratios correspond to different types of actual inspections. The plural predetermined minimum numbers correspond to the different types of actual inspections. The control unit 4 allocates each slot with a combination of the above-described three different inspections, based on the actual recipe.

Figure 4:
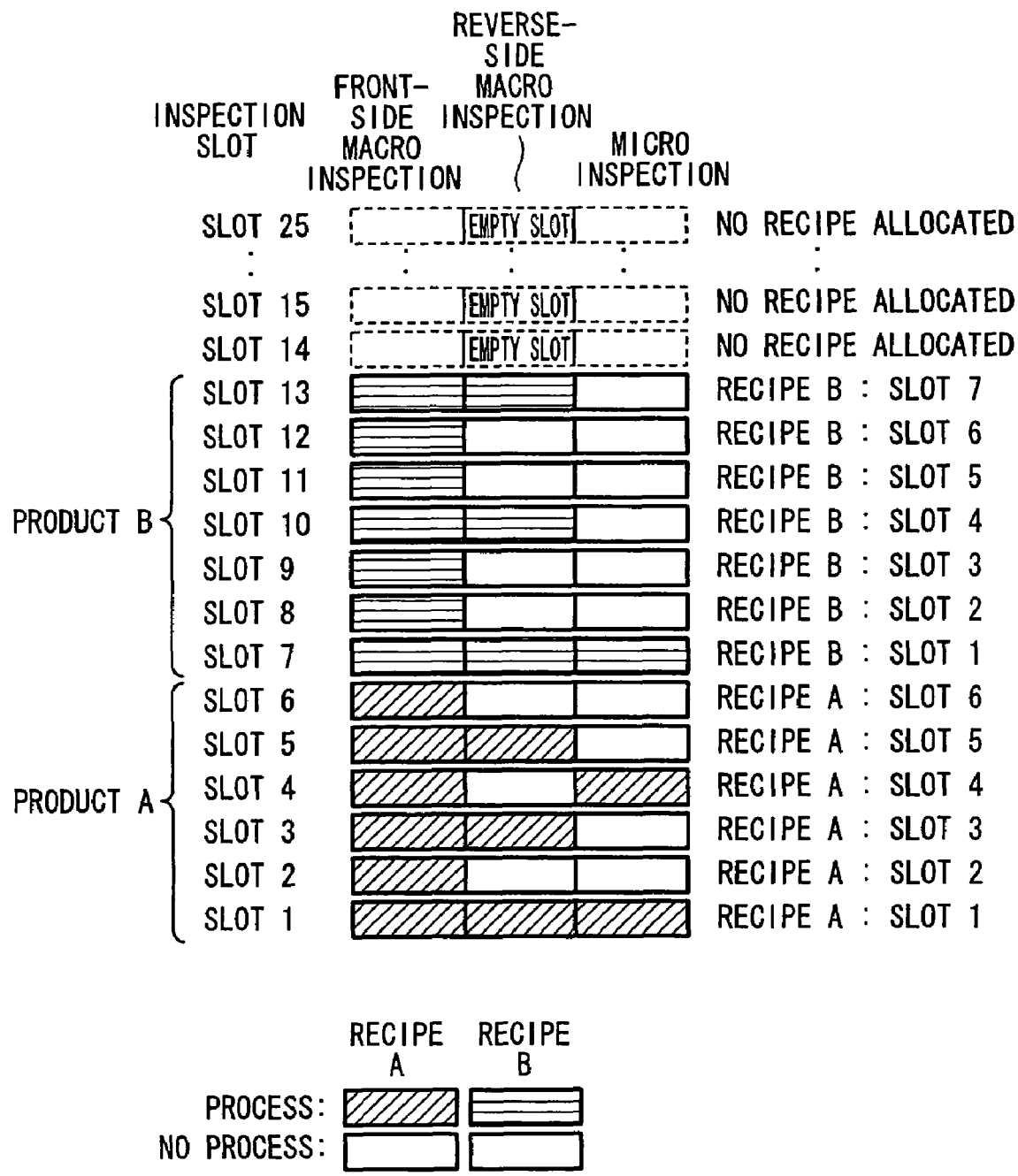
FIG. 4 is a view showing an example of the actual recipe which was prepared by a control unit based on the recipes "A" and "B" shown in FIGS. 3A and 3B in accordance with a preparation method of the present invention.

FIG. 4 is a view showing an example of the actual recipes which were prepared by the control unit 4 based on the recipes "A" and "B" shown in FIGS. 3A and 3B according to a preparation method of the present invention. The actual recipe shown in FIG. 4 is used for a cassette that has slots 1-6, each containing a first type wafer for a product "A", slots 7-13, each containing a second type wafer for a product "B", and empty slots 14-25.

The actual recipe has the following contents shown in FIG. 4. The actual recipe allocates the slot 1 with the same contents as those that have been allocated to the slot 1 according to the original recipe "A" shown in FIG. 3A. For example, the actual recipe defines that, for a wafer of the slot 1, all the front-side macro inspection, the reverse-side macro inspection and the micro inspection are to be carried out.

The actual recipe also allocates the slot 2 with the same contents as those that have been allocated to the slot 2 according to the original recipe "A" shown in FIG. 3A. For example, the actual recipe defines that, for a wafer of the slot 2, only the front-side macro inspection is to be carried out, and the reverse-side macro inspection and the micro inspection are not to be carried out.

The actual recipe also allocates the slot 3 with the same contents as those that have been allocated to the slot 3 according to the original recipe "A" shown in FIG. 3A. For example, the actual recipe defines that, for a wafer of the slot 3, the front-side macro inspection and the reverse-side macro inspection are to be carried out, and the micro inspection is not to be carried out.

The actual recipe also allocates the slot 4 with the same contents as those that have been allocated to the slot 4 according to the original recipe "A" shown in FIG. 3A. For example, the actual recipe defines that, for a wafer of the slot 4, the front-side macro inspection and the micro inspection are to be carried out, and the reverse-side macro inspection is not to be carried out.

The actual recipe also allocates the slot 5 with the same contents as those that have been allocated to the slot 5 according to the original recipe "A" shown in FIG. 3A. For example, the actual recipe defines that, for a wafer of the slot 5, the front-side macro inspection and the reverse-side macro inspection are to be carried out, and the micro inspection is not to be carried out.

The actual recipe also allocates the slot 6 with the same contents as those that have been allocated to the slot 6 according to the original recipe "A" shown in FIG. 3A. For example, the actual recipe defines that, for a wafer of the slot 6, only the front-side macro inspection is to be carried out, and the reverse-side macro inspection and the micro inspection are not to be carried out.

The actual recipe also allocates the slot 7 with the same contents as those that have been allocated to the slot 1 according to the original recipe "B" shown in FIG. 3B. For example, the actual recipe defines that, for a wafer of the slot 7, all the front-side macro inspection, the reverse-side macro inspection and the micro inspection are to be carried out.

The actual recipe also allocates the slot 8 with the same contents as those that have been allocated to the slot 2 according to the original recipe "B" shown in FIG. 3B. For example, the actual recipe defines that, for a wafer of the slot 8, only the front-side macro inspection is to be carried out, and the reverse-side macro inspection and the micro inspection are not to be carried out.

The actual recipe also allocates the slot 9 with the same contents as those that have been allocated to the slot 3 according to the original recipe "B" shown in FIG. 3B. For example, the actual recipe defines that, for a wafer of the slot 9, only the front-side macro inspection is to be carried out, and the reverse-side macro inspection and the micro inspection are not to be carried out.

The actual recipe also allocates the slot 10 with the same contents as those that have been allocated to the slot 4 according to the original recipe "B" shown in FIG. 3B. For example, the actual recipe defines that, for a wafer of the slot 10, the front-side macro inspection and the reverse-side macro inspection are to be carried out, and the micro inspection is not to be carried out.

The actual recipe also allocates the slot 11 with the same contents as those that have been allocated to the slot 5 according to the original recipe "B" shown in FIG. 3B. For example, the actual recipe defines that, for a wafer of the slot 11, only the front-side macro inspection is to be carried out, and the reverse-side macro inspection and the micro inspection are not to be carried out.

The actual recipe also allocates the slot 12 with the same contents as those that have been allocated to the slot 6 according to the original recipe "B" shown in FIG. 3B. For example, the actual recipe defines that, for a wafer of the slot 12, only the front-side macro inspection is to be carried out, and the reverse-side macro inspection and the micro inspection are not to be carried out.

The actual recipe also allocates the slot 13 with the same contents as those that have been allocated to the slot 7 according to the original recipe "B" shown in FIG. 3B. For example, the actual recipe defines that, for a wafer of the slot 13, the front-side macro inspection and the reverse-side macro inspection are to be carried out, and the micro inspection is not to be carried out.

No recipe is allocated to the empty slots 14-25.

Processes for preparing the actual recipe of FIG. 4 will be described with reference again to FIGS. 1 and 2. The operation unit 2 is operated by an inspector so as to supply the control unit 4 with instructions to edit the original recipes so as to prepare an actual recipe. For example, the operation unit 2 is operated to switch the current operation mode to an actual recipe preparation mode of the wafer inspection apparatus. The operation unit 2 supplies the control unit 4 with a signal that indicates switching the current operation mode into the actual recipe preparation mode. Upon receipt of the signal from the operation unit 2, the control unit 4 switches the current operation mode into the actual recipe preparation mode. Signals that designate the original recipes "A" and "B" are inputted into the operation unit 2 by the inspector. The operation unit 2 supplies the control unit 4 with the signals that designate the original recipes "A" and "B". The control unit 4 accesses to the storage unit 5 in order to read out the original recipes "A" and "B" from the storage unit 5.

The control unit 4 prepares display data to be used for displaying each of the original recipes "A" and "B". The control unit 4 supplies the display unit 1 with the display data, so that the display unit 1 displays the contents of the original recipes "A" and "B" to enable the inspector to confirm the contents of the original recipes "A" and "B". After this confirmation, data for preparing an actual recipe is entered into the operation unit 2 by the inspector. The operation unit 2 supplies the control unit 4 with signals that represent the contents of an actual recipe to be prepared.

The control unit 4 prepares the actual recipe based on the signals from the operation unit 2. For example, the inspector may operate switches and/or buttons of the operation unit 2 so as to enter an allocation-start slot, an allocation-end slot and a selected original recipe to be allocated. The allocation-start slot is a first slot, to which allocation of a selected original recipe is first made. The allocation-end slot is a final slot, to which allocation of the selected original recipe is finally made. The selected original recipe is selected from one of the plural original recipes. The allocation-start slot and the allocation-end slot are based on the prepared actual recipe, but not based on any of the original recipes.

If slots 1 and 6 are designated as the inspection-start slot and the inspection-end slot respectively and also the original recipe "A" is designated, then the control unit 4 allocates the contents of the slots 1-6 of the original recipe "A" shown in FIG. 3A to the slots 1-6 of the actual recipe shown in FIG. 4, respectively. For example, the contents of the slot 1 of the original recipe "A" are allocated to the slot 1 of the actual recipe. The contents of the slot 2 of the original recipe "A" are allocated to the slot 2 of the actual recipe. The contents of the slot 3 of the original recipe "A" are allocated to the slot 3 of the actual recipe. The contents of the slot 4 of the original recipe "A" are allocated to the slot 4 of the actual recipe. The contents of the slot 5 of the original recipe "A"

are allocated to the slot 5 of the actual recipe. The contents of the slot 6 of the original recipe "A" are allocated to the slot 6 of the actual recipe.

Subsequently, if slots 7 and 13 are designated as the inspection-start slot and the inspection-end slot, and the original recipe "B" is designated, then the control unit 4 allocates the contents of the slots 1-7 of the original recipe "B" shown in FIG. 3B to the slots 7-13 of the actual recipe shown in FIG. 4, respectively.

The above-described allocations are made in the sequence of numerical numbers of slots of the recipes "A" and "B" shown in FIGS. 3A and 3B, independent from the sequence of numerical number of the slots of the actual recipe shown in FIG. 4.

Subsequently, if slots 14 and 25 are designated as the inspection-start slot and the inspection-end slot, and the empty state is designated, then the control unit 4 does not allocate any contents of the original recipes shown in FIGS. 3A and 3B to the slots 14-25 of the actual recipe shown in FIG. 4, thereby preparing and completing the actual recipe shown in FIG. 4. If none of the slots 14-25 of the actual recipe are designated and instructions to promptly prepare the actual recipes are made, then the control unit 4 does not allocate any contents of the original recipes shown in FIGS. 3A and 3B to the slots 14-25 of the actual recipe shown in FIG. 4, thereby preparing and completing the actual recipe shown in FIG. 4. The control unit 4 stores the actual recipe in the storage unit 5.

It is optionally possible that a wafer sensor is provided on the cassette loader 9 to detect the presence or absence of a wafer in a slot of the cassette in the cassette loader 9, so that no allocation is made to the empty slot, based on the result of the detection by the wafer sensor.

Instead of the present invention, the actual recipe shown in FIG. 4 may be prepared by a known conventional technique that uses at least four different types of recipe for a single wafer processing apparatus. Notwithstanding, it is necessary that any one of the at least four different types of recipe is selected and allocated for each of the slots 1-13 sequentially. Namely, the recipes are allocated to all the slots through a single wafer allocation processing method that allocates the recipes to the slots one by one.

In accordance with the first embodiment of the present invention, the control unit 4 has a recipe preparing function to edit the plural original recipes and prepare the actual recipe of FIG. 4, wherein selected one of the plural original recipes is batch-allocated to a plurality of slots that belongs to a selected one of the plural types of products or wafers. This batch-allocation will be continued for all the plural original recipes, so that the plural original recipes are allocated to all the slots through a semi-batch-allocation processing as described above. A single-time allocation of an original recipe is made for a plurality of slots that are selected or designated in all the slots. In accordance with the semi-batch-allocation processing of the present invention, plural-time allocations of the plural original recipes are made for all the slots, provided that one of the plural allocations of an original recipe is made for a plurality of slots that are selected or designated in all the slots. For example, two different original recipes may be allocated to slots through two separate recipe-allocation processes. In this case, it is possible that a first allocation of a first original recipe is made for a first plurality of slots that are selected or designated in all the slots, and then a second allocation of a second original recipe is made to a second plurality of slots that are selected or designated in all the slots, without allocating any recipe to the remaining slots that are empty.

It is also possible that a first allocation of a first original recipe is made to a plurality of slots that are selected or designated in all the slots, and then a second allocation of a second original recipe is made to the remaining slots.

It should be apparent that the semi-batch-allocation processing of the present invention is different from the known single-wafer-allocation processing and from a batch-allocation processing that allocates a single original recipe to all the slots, except for an empty slot or slots, through a single allocation process.

The above-described method of preparing the actual recipes in accordance with the present invention enables an inspector to allocate a plurality of the original recipes to slots without performing any complex or troublesome operations. The above-described method also improves the operability in preparing and completing an actual recipe from the plural original recipes. It will, therefore, be apparent to a person skilled in the art that the above-described method is suitable for limited production of a wide variety of products.

The micro inspection may, if at all, be a sampling inspection in order to shorten an inspection time. In this case, the wafer inspection apparatus has a sampling inspection mode in which some of the wafers are subjected to the inspection, while the remainder is not subjected to the inspection.

Alternatively, the actual recipe shown in FIG. 4 may advantageously be prepared by the control unit 4, based on instructions from an external device such as a host computer (not illustrated). For example, the control unit 4 may receive the instructions from the host computer through the communication control unit 3. The above-described method of preparing the actual recipe according to the present invention enables an inspector to prepare and complete an actual recipe from the plural original recipes, without performing any complex or troublesome instructions through the host computer. This configuration reduces the load on the host computer and improves the throughput of the host computer.

Figure 5:
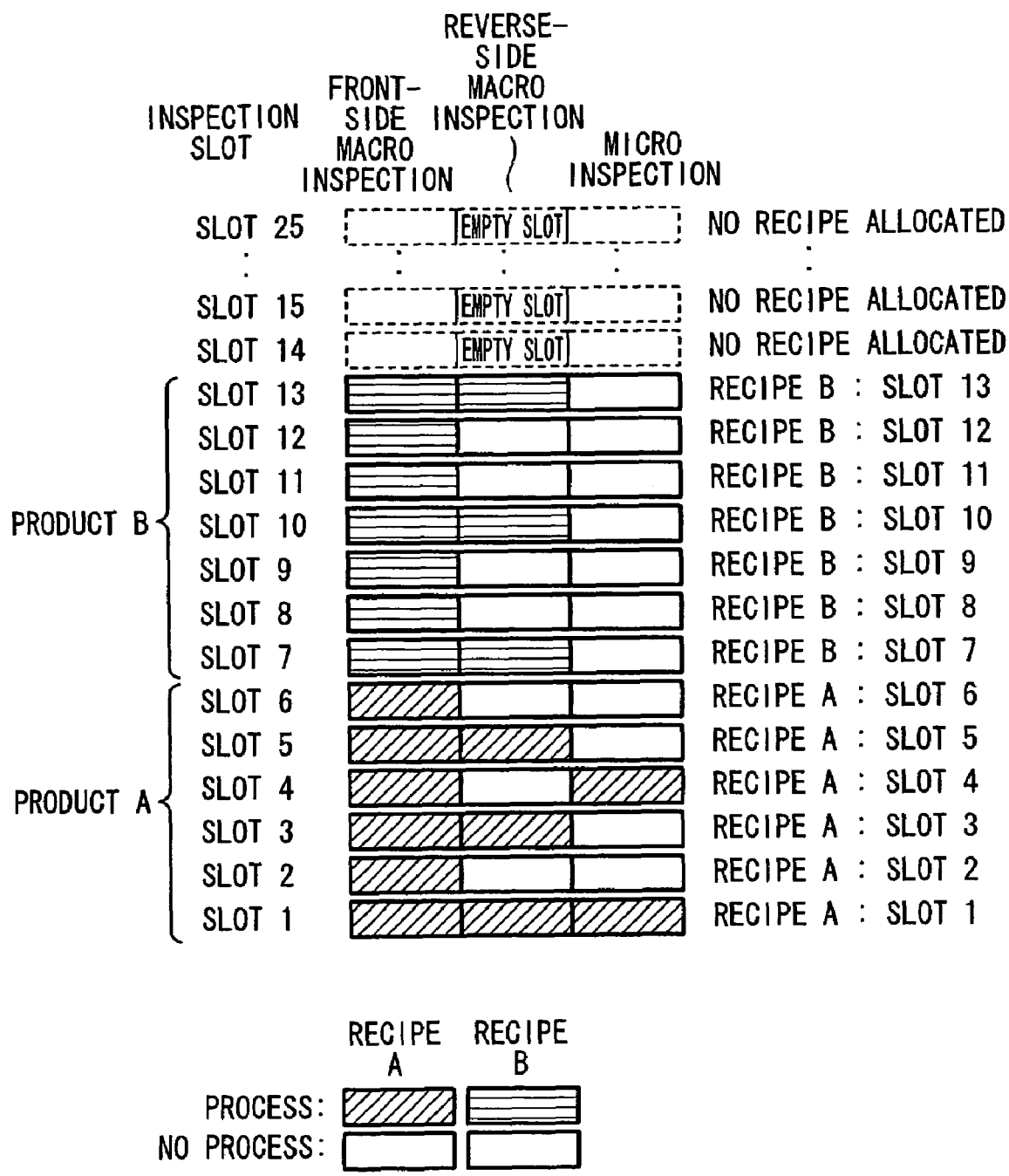
FIG. 5 is a view showing another example of the actual recipe which was prepared by the control unit based on the recipes "A" and "B" shown in FIGS. 3A and 3B in accordance with a preparation method of the present invention.

Another example of the actual recipe will be described. FIG. 5 is a view showing another example of the actual recipe which was prepared by the control unit 4 based on the original recipes "A" and "B" shown in FIGS. 3A and 3B in accordance with a preparation method of the present invention. An actual recipe shown in FIG. 5 is different from the above-described actual recipe shown in FIG. 4.

The actual recipe shown in FIG. 5 is used for a cassette that has slots 1-6, each containing a first type wafer for a product "A", slots 7-13, each containing a second type wafer for a product "B", and empty slots 14-25.

The actual recipe has the following contents shown in FIG. 5. The actual recipe allocates the slot 1 with the same contents as those that have been allocated to the slot 1 according to the original recipe "A" shown in FIG. 3A. For example, the actual recipe defines that, for a wafer of the slot 1, all the front-side macro inspection, the reverse-side macro inspection and the micro inspection are to be carried out.

The actual recipe also allocates the slot 2 with the same contents as those that have been allocated to the slot 2 according to the original recipe "A" shown in FIG. 3A. For example, the actual recipe defines that, for a wafer of the slot 2, only the front-side macro inspection is to be carried out, and the reverse-side macro inspection and the micro inspection are not to be carried out.

The actual recipe also allocates the slot 3 with the same contents as those that have been allocated to the slot 3 according to the original recipe "A" shown in FIG. 3A. For example, the actual recipe defines that, for a wafer of the slot 3, the front-side macro inspection and the reverse-side macro inspection are to be carried out, and the micro inspection is not to be carried out.

The actual recipe also allocates the slot 4 with the same contents as those that have been allocated to the slot 4 according to the original recipe "A" shown in FIG. 3A. For example, the actual recipe defines that, for a wafer of the slot 4, the front-side macro inspection and the micro inspection are to be carried out, and the reverse-side macro inspection is not to be carried out.

The actual recipe also allocates the slot 5 with the same contents as those that have been allocated to the slot 5 according to the original recipe "A" shown in FIG. 3A. For example, the actual recipe defines that, for a wafer of the slot 5, the front-side macro inspection and the reverse-side macro inspection are to be carried out, and the micro inspection is not to be carried out.

The actual recipe also allocates the slot 6 with the same contents as those that have been allocated to the slot 6 according to the original recipe "A" shown in FIG. 3A. For example, the actual recipe defines that, for a wafer of the slot 6, only the front-side macro inspection is to be carried out, and the reverse-side macro inspection and the micro inspection are not to be carried out.

The actual recipe also allocates the slot 7 with the same contents as those that have been allocated to the slot 7 according to the original recipe "B" shown in FIG. 3B. For example, the actual recipe defines that, for a wafer of the slot 7, all the front-side macro inspection, the reverse-side macro inspection and the micro inspection are to be carried out.

The actual recipe also allocates the slot 8 with the same contents as those that have been allocated to the slot 8 according to the original recipe "B" shown in FIG. 3B. For example, the actual recipe defines that, for a wafer of the slot 8, only the front-side macro inspection is to be carried out, and the reverse-side macro inspection and the micro inspection are not to be carried out.

The actual recipe also allocates the slot 9 with the same contents as those that have been allocated to the slot 9 according to the original recipe "B" shown in FIG. 3B. For example, the actual recipe defines that, for a wafer of the slot 9, only the front-side macro inspection is to be carried out, and the reverse-side macro inspection and the micro inspection are not to be carried out.

The actual recipe also allocates the slot 10 with the same contents as those that have been allocated to the slot 10 according to the original recipe "B" shown in FIG. 3B. For example, the actual recipe defines that, for a wafer of the slot 10, the front-side macro inspection and the reverse-side macro inspection are to be carried out, and the micro inspection is not to be carried out.

The actual recipe also allocates the slot 11 with the same contents as those that have been allocated to the slot 11 according to the original recipe "B" shown in FIG. 3B. For example, the actual recipe defines that, for a wafer of the slot 11, only the front-side macro inspection is to be carried out, and the reverse-side macro inspection and the micro inspection are not to be carried out.

The actual recipe also allocates the slot 12 with the same contents as those that have been allocated to the slot 12 according to the original recipe "B" shown in FIG. 3B. For example, the actual recipe defines that, for a wafer of the slot 12, only the front-side macro inspection is to be carried out, and the reverse-side macro inspection and the micro inspection are not to be carried out.

The actual recipe also allocates the slot 13 with the same contents as those that have been allocated to the slot 13 according to the original recipe "B" shown in FIG. 3B. For example, the actual recipe defines that, for a wafer of the slot 13, the front-side macro inspection and the reverse-side macro inspection are to be carried out, and the micro inspection is not to be carried out.

No recipes are allocated to the empty slots 14-25.

The allocations of the recipes are made so that numerical numbers of the slots of the actual recipe are equal to numerical numbers of the slots on the original recipes "A" and "B". Processes for preparing the actual recipe of FIG. 5 are similar to the above-described processes for preparing the actual recipe of FIG. 4, except that the wafer inspection apparatus has previously been set such that numerical numbers of the slots of the actual recipe are equal to numerical numbers of the slots of the original recipes "A" and "B". Processes for preparing the actual recipe of FIG. 5 will be described with reference again to FIGS. 1 and 2.

For example, if slots 1 and 6 are designated as the inspection-start slot and the inspection-end slot of the actual recipe, and also the original recipe "A" is designated, then the control unit 4 allocates the contents of the slots 1-6 of the original recipe "A" to the slots 1-6 of the actual recipe, respectively. For example, the contents of the slot 1 of the original recipe "A" are allocated to the slot 1 of the actual recipe. The contents of the slot 2 of the original recipe "A" are allocated to the slot 2 of the actual recipe. The contents of the slot 3 of the original recipe "A" are allocated to the slot 3 of the actual recipe. The contents of the slot 4 of the original recipe "A" are allocated to the slot 4 of the actual recipe. The contents of the slot 5 of the original recipe "A" are allocated to the slot 5 of the actual recipe. The contents of the slot 6 of the original recipe "A" are allocated to the slot 6 of the actual recipe.

Subsequently, if slots 7 and 13 are designated as the inspection-start slot and the inspection-end slot on the actual recipes, and also the original recipe "B" is designated, then the control unit 4 allocates the contents of the slots 7-13 of the original recipe "B" to the slots 7-13 of the actual recipe, respectively. The contents of the slot 7 of the original recipe "B" are allocated to the slot 7 of the actual recipe. The contents of the slot 8 of the original recipe "B" are allocated to the slot 8 of the actual recipe. The contents of the slot 9 of the original recipe "B" are allocated to the slot 9 of the actual recipe. The contents of the slot 10 of the original recipe "B" are allocated to the slot 10 of the actual recipe. The contents of the slot 11 of the original recipe "B" are allocated to the slot 11 of the actual recipe. The contents of the slot 12 of the original recipe "B" are allocated to the slot 12 of the actual recipe. The contents of the slot 13 of the original recipe "B" are allocated to the slot 13 of the actual recipe.

Subsequently, if slots 14 and 25 are designated as the inspection-start slot and the inspection-end slot on the actual recipes, and the empty state is designated, then the control unit 4 does not allocate any content of the original recipes to the slots 14-25 of the actual recipe, thereby preparing and completing the actual recipe shown in FIG. 5. If none of the slots 14-25 of the actual recipe are designated and instructions to promptly prepare the actual recipe are made, then the control unit 4 does not allocate any content of the original recipes to the slots 14-25 of the actual recipes, thereby preparing and completing the actual recipe shown in FIG. 5. The control unit 4 stores the actual recipe in the storage unit 5.

It is possible that the inspector may have previously designated one of the following two allocation methods. The first method is that the above-described allocations are made in the sequence of numerical numbers of slots of the original recipes "A" and "B", independent from the sequence of numerical number of the slots on the actual recipe. The second method is that the above-described allocations are made so that numerical numbers of the slots of the actual recipe are equal to numerical numbers of the slots on the original recipes "A" and "B". This designation may be made by operating an external device such as a host computer (not illustrated).

In accordance with the first embodiment of the present invention, the control unit 4 has a recipe preparing function to edit the plural original recipes and prepare the actual recipe of FIG. 4, wherein the selected one of the plural original recipes is batch-allocated to a plurality of slots that belongs to the selected one of the plural types of products or wafers. This batch-allocation will be continued for all the plural original recipes, so that the plural original recipes are allocated to all the slots through a semi-batch-allocation processing as described above. A single-time allocation of an original recipe is made to a plurality of slots that are selected or designated in all the slots. In accordance with the semi-batch-allocation processing of the present invention, plural-times allocations of the plural original recipes are made to all the slots, provided that one of the plural allocations of an original recipe is made to a plurality of slots that are selected or designated in all the slots. For example, two different original recipes may be allocated to slots through two separate recipe-allocation processes. In this case, it is possible that a first allocation of a first original recipe is made to a first plurality of slots that are selected or designated in all the slots, and then a second allocation of a second original recipe is made to a second plurality of slots that are selected or designated in all the slots, without allocating any recipe to the remaining slots that are empty. It is also possible that a first allocation of a first original recipe is made to a plurality of slots that are selected or designated in all the slots, and then a second allocation of a second original recipe is made to the remaining slots.

It should be apparent that the semi-batch-allocation processing of the present invention is different from the known single-wafer-allocation processing and from a batch-allocation processing that allocates a single original recipe to all the slots, except for an empty slot or slots, through a single allocation process.

The above-described method of preparing the actual recipes in accordance with the present invention enables an inspector to allocate a plurality of the original recipes to slots without performing any complex or troublesome operations. The above-described method also improves the operability in preparing and completing an actual recipe from the plural original recipes. It will, therefore, be apparent to a person skilled in the art that the above-described method is suitable for limited production of a wide variety of products.

Figure 6:
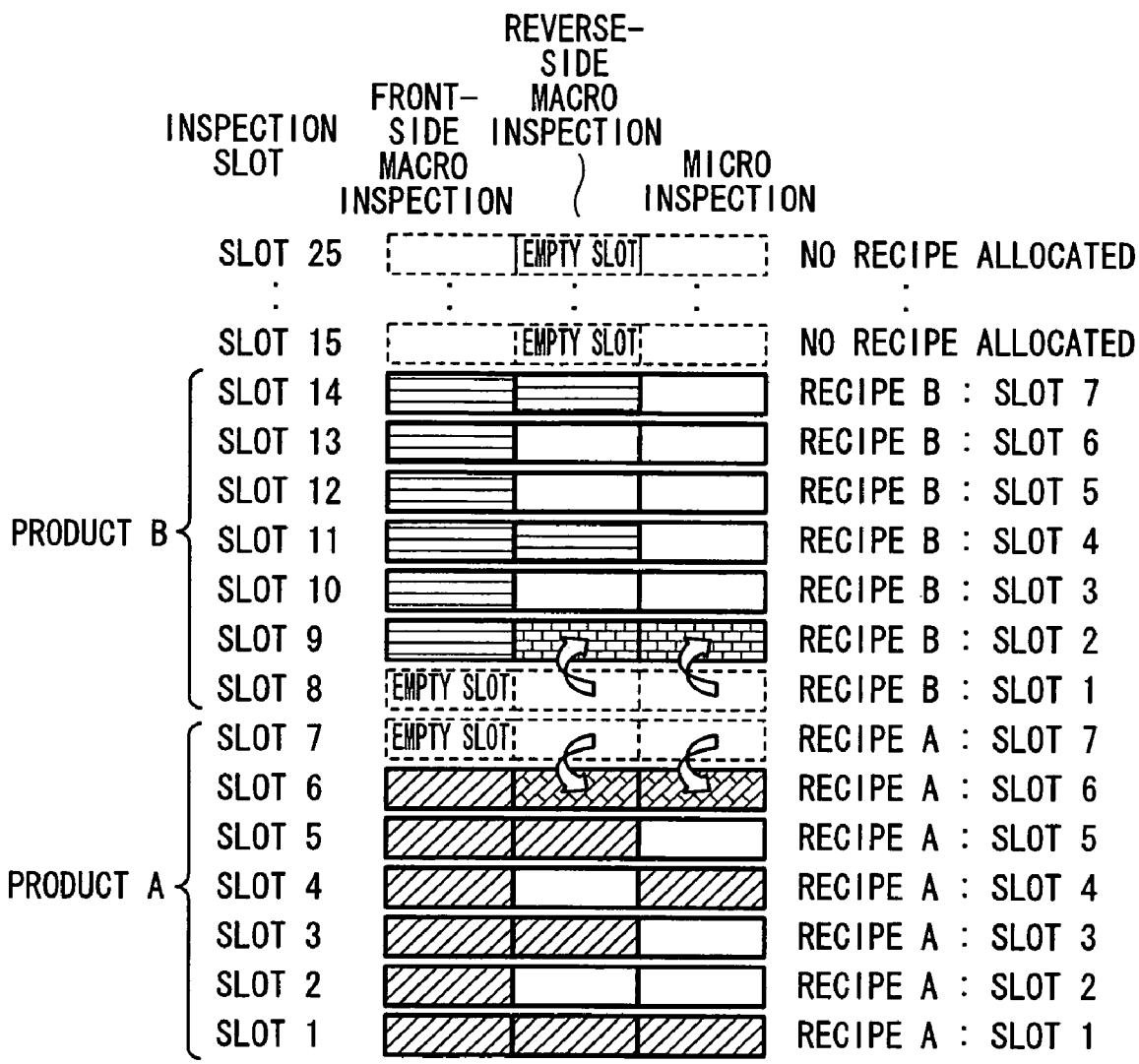
FIG. 6 is a view showing still another example of the actual recipe which was prepared by the control unit based on the recipes "A" and "B" shown in FIGS. 3A and 3B in accordance with a preparation method of the present invention.
Figure 6:
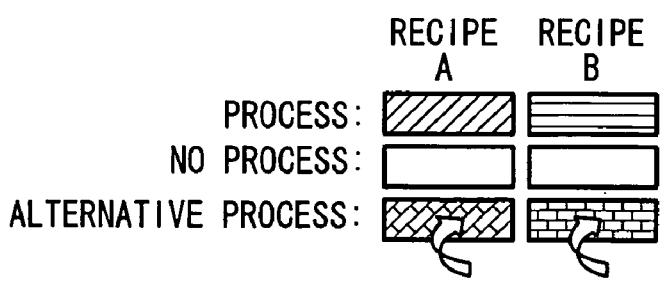

FIG. 6 is a view showing still another example of the actual recipe which was prepared by the control unit 4 based on the original recipes "A" and "B" shown in FIGS. 3A and 3B in accordance with a preparation method of the present invention. An actual recipe shown in FIG. 6 is different from the above-described actual recipes shown in FIGS.4 and 5.

An original recipe is prepared for each type of product. Plural original recipes correspond to the plural types of products, respectively. Namely, a plurality of original recipes is prepared for producing a wide variety of products. Each of the original recipes includes one or more conditions for inspection. Typical examples of the inspection conditions may include, but are not limited to, a sampling inspection ratio and a predetermined minimum number of inspection times. The sampling inspection ratio is given for each of the different types of actual inspections. The sampling inspection ratio is defined to be a ratio of the number of wafers which are subjected to the inspection to other wafers which are free from the inspection. The predetermined minimum number of inspection times is also given for each of the different types of actual inspections. For example, if two types of actual inspections should be made, then a first sampling inspection ratio and a first minimum number of inspection times are given for the first type inspection, and a second sampling inspection ratio and a second minimum number of inspection times are given for the second type inspection.

An actual recipe to be used for the actual inspection is prepared by the control unit 4 from the plural original recipes. Each of the original recipes includes inspection conditions for each type of product or wafer. The actual recipe includes plural inspection conditions that are given for plural types of products or wafers respectively, so that it is verified whether or not the actual recipe satisfies the inspection conditions for each of the plural types of products or wafers. If the actual recipe does not satisfy the inspection conditions, then the actual recipe is re-allocated automatically by the control unit 4 without any operation by an inspector, so that a re-allocated actual recipe satisfies the inspection conditions for as many slots as possible, preferably for all the slots.

The single cassette may, for example, include 25 slots, each containing a single wafer. It is assumed that slots 7 and 8 have become empty accidentally in a process prior to the inspection process. Emptying the slots 7 and 8 makes it unnecessary to verify whether or not the inspection conditions are satisfied. The empty slots 7 and 8 are not subjected to the sampling inspection. Sampling inspections which have been set for the slots 7 and 8 are re-set so that the sampling inspections are alternatively made to other slots, for example, slots 6 and 9 instead of the slots 7 and 8. This resetting process will be referred to as an alternative process.

Processes for preparing the actual recipe of FIG. 6 will be described with reference again to FIGS. 1 and 2. An actual recipe is prepared by the same processes as described above. For example, if slots I and 7 are designated as the inspection-start slot and the inspection-end slot of the actual recipe, and also the original recipe "A" is designated, then the control unit 4 allocates the contents of the slots 1-7 of the original recipe "A" to the slots 1-7 of the actual recipe, respectively. For example, the contents of the slot 1 of the original recipe "A" are allocated to the slot 1 of the actual recipe. The contents of the slot 2 of the original recipe "A" are allocated to the slot 2 of the actual recipe. The contents of the slot 3 of the original recipe "A" are allocated to the slot 3 of the actual recipe. The contents of the slot 4 of the original recipe "A" are allocated to the slot 4 of the actual recipe. The contents of the slot 5 of the original recipe "A" are allocated to the slot 5 of the actual recipe. The contents of the slot 6 of the original recipe "A" are allocated to the slot 6 of the actual recipe. The contents of the slot 7 of the original recipe "A" are allocated to the slot 7 of the actual recipe.

Subsequently, if slots 8 and 14 are designated as the inspection-start slot and the inspection-end slot on the actual recipes, and also the original recipe "B" is designated, then the control unit 4 allocates the contents of the slots 1-7 of the original recipe "B" to the slots 8-14 of the actual recipe, respectively. The contents of the slot 1 of the original recipe "B" are allocated to the slot 8 of the actual recipe. The contents of the slot 2 of the original recipe "B" are allocated to the slot 9 of the actual recipe. The contents of the slot 3 of the original recipe "B" are allocated to the slot 10 of the actual recipe. The contents of the slot 4 of the original recipe "B" are allocated to the slot 11 of the actual recipe. The contents of the slot 5 of the original recipe "B" are allocated to the slot 12 of the actual recipe. The contents of the slot 6 of the original recipe "B" are allocated to the slot 13 of the actual recipe. The contents of the slot 7 of the original recipe "B" are allocated to the slot 14 of the actual recipe.

Subsequently, if slots 15 and 25 are designated as the inspection-start slot and the inspection-end slot on the actual recipes, and the empty state is designated, then the control unit 4 does not allocate any content of the original recipes to the slots 15-25 of the actual recipe, thereby preparing and completing the actual recipe shown in FIG. 6. If none of the slots 15-25 of the actual recipe are designated and instructions to promptly prepare the actual recipe are made, then the control unit 4 does not allocate any content of the original recipes to the slots 15-25 of the actual recipes, thereby preparing and completing the actual recipe shown in FIG. 6.

Subsequently, the control unit 4 sends the cassette loader 9 instructions to verify whether or not a wafer is contained in each of the slots 1-14 that have been allocated with the actual recipe. The cassette loader 9 has a wafer sensor for detecting the presence or absence of a wafer in each slot of the cassette in the cassette loader 9. The wafer sensor is not illustrated in FIGS. 1 and 2. The cassette loader 9 sends the control unit 4 the result of the detection by the wafer sensor. The control unit 4 judges or determines the fact that the slots 7 and 8 are empty based on the result of the detection. Alternatively, it is also possible that the control unit 4 communicates through the communication control unit 3 to an external device such as a host computer, so that the control unit 4 receives information about empty slots from the host computer.

Subsequently, if the above-described inspection conditions are not satisfied, then the contents of the actual recipe which have been allocated to the empty slots are newly set for other slots than the empty slots in accordance with the above-described alternative process, provided that the other slots belong to the same original recipe as the empty slots. For the alternative process, conditions for re-allocating the contents of the actual recipe to the other slots, instead of the empty slots, may advantageously have been determined and set in the wafer inspection apparatus. Typical examples of the conditions for re-allocating the contents of the actual recipe to the other slots may advantageously be, but are not limited to, that the contents of the actual recipe which have been allocated to an empty slot are newly re-allocated to another slot that is adjacent to the empty slot. For example, as shown in FIG. 6, the control unit 4 performs a first alternative process so that the contents of the actual recipe which have been allocated to the empty slot 7 are newly re-allocated to the slot 6 that is adjacent to the empty slot 7 and belongs to the same original recipe "A" as the slot 7. The control unit 4 further performs a second alternative process so that the contents of the actual recipe which have been allocated to the empty slot 8 are newly allocated to the slot 9 that is adjacent to the empty slot 8 and belongs to the same original recipe "B" as the slot 8.

The non-empty slot 6 and the empty slot 8 are adjacent to the empty slot 7. The contents of the actual recipe which have been allocated to the empty slot 7 are newly allocated for the non-empty slot 6. Prior to the modification of the actual recipe by the alternative process, the empty slot 7 of the actual recipe is allocated with the contents of the original recipe "A" that were allocated to the slot 7 of the original recipe "A". The actual recipe is re-allocated through the alternative process, so that the contents of the actual recipe which have been allocated to the empty slot 7 are newly allocated for the non-empty slot 6. The contents of the actual recipe which have been allocated to the empty slot 7 are the same as the contents of the original recipe "A" that were allocated to the slot 7. As shown in FIG. 3A, the contents of the original recipe "A" which were allocated to the slot 7 include three inspections, for example, the front-side macro inspection, the reverse-side macro inspection and the micro inspection. The contents of the non-re-allocated actual recipe which have been allocated to the slot 6 include one inspection, for example, the front-side macro inspection. The alternative process modifies the actual recipe so that the three inspections, for example, the front-side macro inspection, the reverse-side macro inspection and the micro inspection are made to a wafer of the slot 6. Namely, the alternative process newly allocates the slot 6 with the reverse-side macro inspection and the micro inspection in addition to the front-side macro inspection to the front-side macro inspection that has already been allocated.

If the above-described inspection conditions are not satisfied completely, then one or more further alternative processes for further re-allocating the once re-allocated actual recipe may be performed by the control unit 4.

The empty slot 7 and the non-empty slot 9 are adjacent to the empty slot 8. The contents of the actual recipe which have been allocated to the empty slot 8 are newly allocated to the non-empty slot 9. Prior to the modification of the actual recipe by the alternative process, the empty slot 8 of the actual recipe is allocated with the contents of the original recipe "B" that were allocated to the slot 1 of the original recipe "B". The actual recipe is re-allocated through the further alternative process, so that the contents of the actual recipe, which have been allocated to the empty slot 8, are newly allocated to the non-empty slot 9. The contents of the actual recipe which have been allocated to the empty slot 8 are the same as the contents of the original recipe "B" that were allocated to the slot 1. As shown in FIG. 3B, the contents of the original recipe "B" which were allocated to the slot 1 include three inspections, for example, the front-side macro inspection, the revise-side macro inspection and the micro inspection. The contents of the first-re-allocated actual recipe, which were allocated to the slot 9, include one inspection, for example, the front-side macro inspection. The alternative process further modifies the first-re-allocated actual recipe so that the three inspections, for example, the front-side macro inspection, the reverse-side macro inspection and the micro inspection are made to a wafer of the slot 9. Namely, the further alternative process newly allocates the slot 9 with the reverse-side macro inspection and the micro inspection in addition to the front-side macro inspection that has already been allocated.

The control unit 4 stores the twice re-allocated actual recipe in the storage unit 5.

The above-described conditions for re-allocating the contents of the actual recipe may have previously been set in the wafer inspection, apparatus. Alternatively, the above-described conditions for re-allocating the contents of the actual recipe may be set through a communication via the communication control unit 3 to an external device such as a host computer (not illustrated). Alternatively, the above-described conditions for re-allocating the contents of the actual recipe may be set for each type of product and may be included in the original recipe. Conditions for re-allocating the contents of the actual recipe should not be limited to those described above. For example, it is possible to avoid the setting sampling process.

As described above, a sampling inspection which has been allocated to a slot is reset so that the sampling inspection is alternatively made to another slot. It is possible to avoid re-setting the sampling inspection to another slot. It is also possible that the above-described alternative process is applied to a slot that has a minimum numerical number and belongs to the same type of product. It is alternatively possible that the above-described alternative process is applied to another slot that has a maximum numerical number and belongs to the same type of product.

A slot may have become empty accidentally in a process prior to the inspection process. In this case, it is necessary for the host computer to issue instructions to perform the above-described alternative process. This increases the load on the host computer and reduces throughput of the host computer. A limited capacity of software installed in the host computer may, if at all, make it difficult to issue instructions to perform the above-described alternative process. If difficult, it is necessary that the request for inspection is withdrawn, so that a wafer carrier is moved from the wafer inspection apparatus to a stocker, and then a new recipe is set which designates non-empty slots for the sampling inspection before wafers are loaded. This known and conventional technique is a time-consuming process and reduces the efficiency of inspection.

In accordance with the present invention, if the actual recipe allocates an empty slot with the contents of the original recipe, then the control unit 4 performs the above-described alternative process for re-allocating the actual recipe, so that the contents of the original recipe having been allocated to the empty slot are newly allocated to a non-empty slot. The sampling inspection is made at a predetermined sampling inspection ratio or at a predetermined minimum number of inspection times, in order to guarantee the requested quality of products, without receiving any special instructions from the host computer or the operation unit 2 if one or more slots become empty accidentally in a process prior to the inspection process. This means that the inspection process can be continued without any interruption, for example, making an enquiry to an inspector or the host computer. This technique of the present invention shortens the necessary time for the inspection and increases the efficiency of inspection.

Second Embodiment

A second embodiment of the present invention will be described. In accordance with the above-described method of the first embodiment, the plural original recipes are designated one by one by an inspector, in order to prepare and complete the actual recipe to be used in the actual inspection. This second embodiment provides a completely automated process for preparing an actual recipe from a plurality of the original recipes. This second embodiment utilizes the same wafer inspection apparatus as shown in FIGS. 1 and 2. Duplicate descriptions of the configuration of the wafer inspection apparatus will be omitted. The following descriptions will focus on differences between the second embodiment and the first embodiment.

Figure 7:
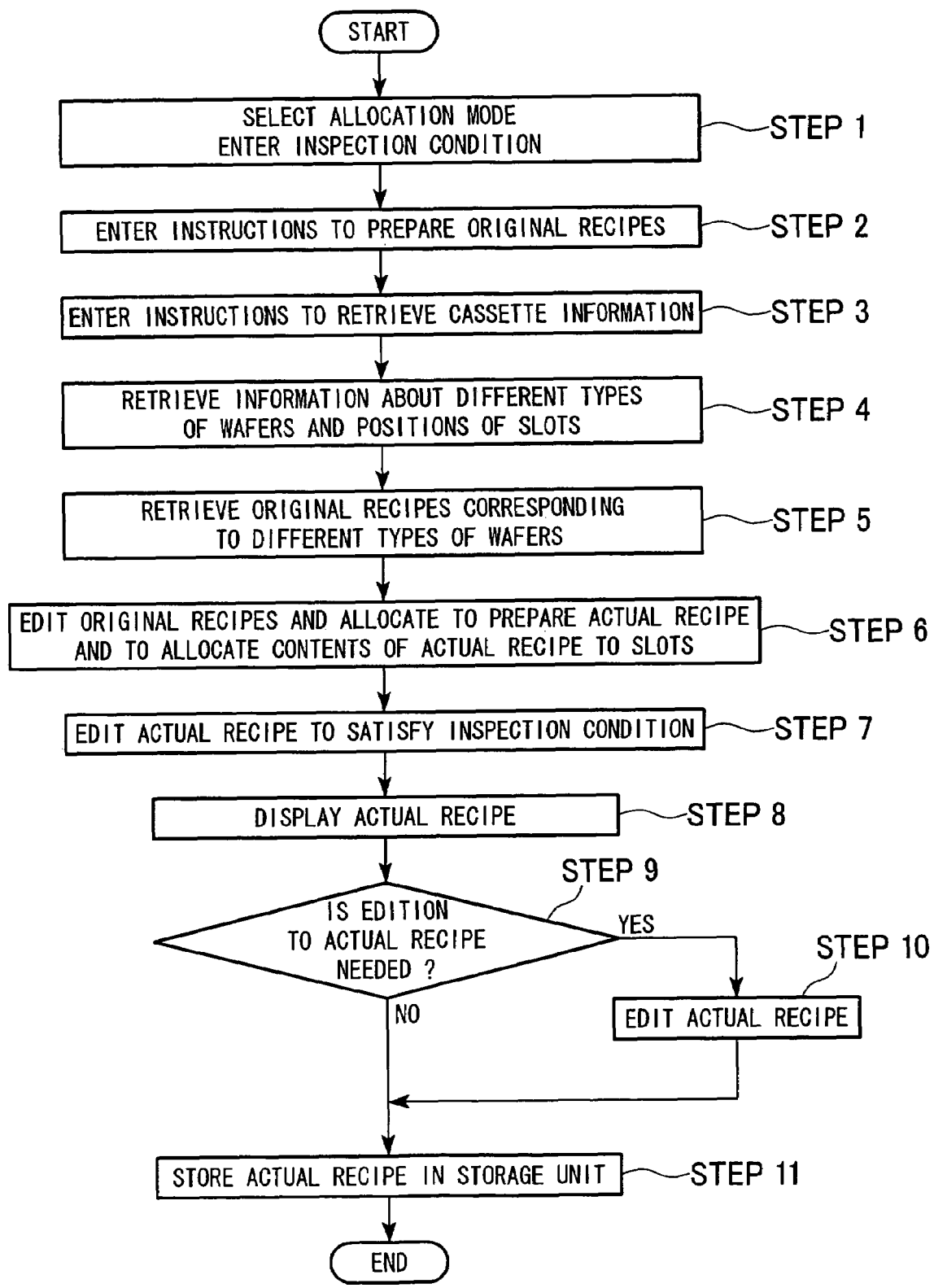
FIG. 7 is a flow chart of a completely automated process for preparing an actual recipe from a plurality of original recipes by the wafer inspection apparatus shown in FIGS. 1 and 2 in accordance with a second embodiment of the present invention.
Figure 8A:
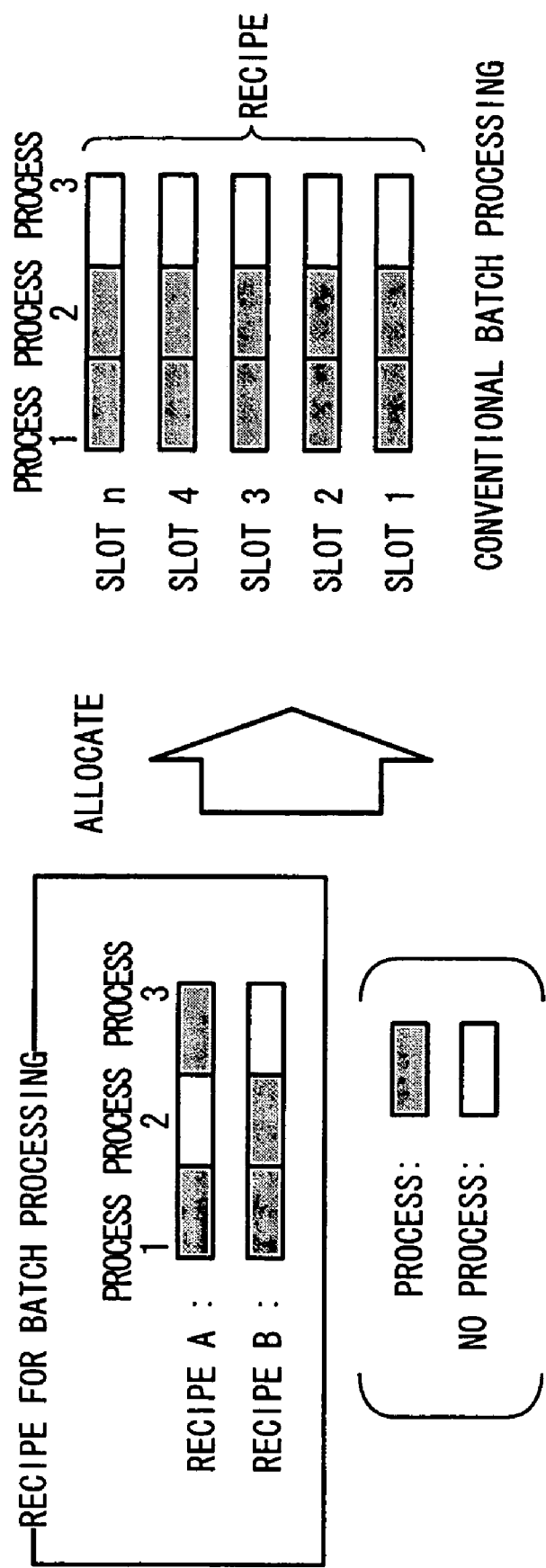
FIG. 8A is a view illustrating an example of the conventional allocation of a recipe to all slots belonging to a process unit in accordance with the conventional batch processing.
Figure 8B:
FIG. 8B is a view illustrating an example of the conventional allocation of different recipes to slots belonging to a process unit in accordance with the conventional single wafer processing.

FIG. 7 is a flow chart of a completely automated process for preparing an actual recipe from a plurality of the original recipes by using the wafer inspection apparatus shown in FIGS. 1 and 2. A plurality of original recipes has been prepared by an inspector before an actual recipe to be used in an actual inspection is prepared automatically. As described in the first embodiment, the original recipes correspond to plural types of products, respectively. Namely, each original recipe corresponds to corresponding one of the plural different types of products. The original recipes may have previously been stored in a host computer that is connected to the communication control unit 3. The host computer is not illustrated in FIGS. 1 and 2. Each Cassette containing wafers has previously been allocated with an identification number. The identification number allocated to the cassette may also have been stored in and managed by the host computer.

In Step 1, one of plural different allocation modes for operations of the above-described wafer inspection apparatus may advantageously be selected by an inspector through a graphical user interface (GUI) that is displayed on the display unit 1. A typical example of the allocation modes may include, but is not limited to, the first mode of allocation described above with reference to FIG. 4. Namely, in accordance with the first allocation mode, the slots 1-6 of the actual recipe are allocated with the contents of the original recipe "A" that have been allocated to the slots 1-6 of the original recipe "A", respectively. The slots 7-13 of the actual recipe are allocated with the contents of the original recipe "B" that have been allocated to the slots 1-7 of the original recipe "B", respectively. No allocation of a recipe is made to the empty slots 14-25. Another typical example of the allocation mode may include, but is not limited to, the second mode of allocation described above with reference to FIG. 5. Namely, in accordance with the second allocation mode, the slots 1-6 of the actual recipe are allocated with the contents of the original recipe "A" that have been allocated to the slots 1-6 of the original recipe "A", respectively. The slots 7-13 of the actual recipe are allocated with the contents of the original recipe "B" that have been allocated to the slots 7-13 of the original recipe "B", respectively. No allocation of a recipe is made to the empty slots 14-25.

If one or more empty slots are present, then either activation or inactivation of a further different allocation mode is made in addition to the above-described mode of selection. A typical example of the further different allocation mode may include, but is not limited to, the third mode of allocation described above with reference to FIG. 6. Namely, in accordance with the third allocation mode, the above described alternative process for re-allocating the actual recipe is performed so that the contents of the original recipe "A" which have been allocated to the empty slot 7 is re-allocated to the non-empty slot 6 adjacent to the empty slot 7, and the contents of the original recipe "B" which have been allocated to the empty slot 8 are re-allocated to the non-empty slot 9 adjacent to the empty slot 8. The above described conditions for inspection may have previously been set in the same manner as described above. A typical example of the inspection conditions may include, but is limited to, a plurality of predetermined ratios in the number of wafers which are subjected to the inspection, to other wafers which are free from the inspection. The plural predetermined ratios correspond to different types of actual inspections. Another typical example of the inspection conditions may include, but not limited to, a plurality of predetermined minimum numbers of wafers to be inspected. The plural predetermined minimum numbers correspond to the different types of actual inspections. The first to third allocation modes and the inspection conditions may have previously been stored in the storage unit 5. Alternatively, the first to third allocation modes and the inspection conditions may have previously been stored in the host computer. Alternatively, the first to third allocation modes and the inspection conditions may be included in the original recipe.

The control unit 4 reads data of selected one or ones of the first to third allocation modes and the inspection conditions.

It is assumed that a cassette contains wafers for two different types of products "A" and "B". It is necessary to prepare the above-described two different original recipes "A" and "B" that correspond to the two types of products "A" and "B", respectively.

In Step 2, instructions to prepare the original recipes "A" and "B" are given to the control unit 4 through the above-described graphical user interface (GUI) displayed on the display unit 1. For example, the graphical user interface may be configured to enable an inspector to select a button for commencing preparation of the original recipes.

In Step 3, upon receipt of the instructions, the control unit 4 gives the communication control unit 3 instructions to retrieve, from the host computer, information about a cassette to be inspected and identification number of the cassette. The information may typically include, but is not limited to, types of wafers and an inter-relationship between the types of wafers and positions of slots containing the wafers in the cassette as well as about positions of empty slots in the cassette.

In Step 4, the communication control unit 3 retrieves, from the host computer, the information about a cassette to be inspected and identification number of the cassette, and supplies the same to the control unit 4. First, the control unit 4 extracts the types of wafers and the positions of slots containing the wafers from the cassette information.

In Step 5, the control unit 4 gives the communication control unit 3 instructions to retrieve, from the host computer, information about original recipes "A" and "B" that correspond to the two types of products "A" and "B". The communication control unit 3 retrieves, from the host computer, the information about the original recipes "A" and In Step 6, the control unit 4 edits or batch-allocates the original recipes "A" and "B" in accordance with the selected allocation mode, so as to prepare an actual recipe and to allocate contents of the actual recipe to slots.

In Step 7, the control unit 4 verifies whether or not the prepared actual recipe satisfies the inspection conditions that have been set in Step 1. As described above, the inspection conditions may be plural sampling inspection ratios that correspond to the different types of actual inspections respectively and/or the plural predetermined minimum numbers of inspection times that correspond to the different types of actual inspections respectively. If the prepared actual recipe does not satisfy the inspection conditions, then the control unit 4 edits or modifies the actual recipe by re-allocating the contents of the actual recipe which has been allocated to an empty slot, and newly re-allocates it to another slot, so that the re-allocated actual recipe satisfies the inspection conditions. If the prepared actual recipe satisfies the inspection conditions, then no edition or modification is made to the actual recipe.

In Step 8, the control unit 4 creates display data representing the actual recipe that satisfies the inspection conditions. The control unit 4 supplies the display unit 1 with the display data, so that the display unit 1 displays information about the actual recipe that satisfies the inspection conditions, so as to enable an inspector to confirm the actual recipe visually. The information about the actual recipe may be displayed using characters.

In Step 9, the control unit 4 does not perform any operation for a predetermined period of time from displaying the information about the actual recipe, in order to enable the inspector to operate the graphical user interface for additionally editing the actual recipe that satisfies the inspection conditions. The control unit 4 waits for an operation of the graphical user interface by the inspector for the predetermined period of time. Namely, the control unit 4 gives the inspector the predetermined period of time to consider and decide to edit the actual recipe or not. The predetermined time period may be, but is not limited to, one minute. If the graphical user interface is operated within the predetermined time period, then the control unit 4 waits until the editing of the actual recipe is completed. For example, the control unit 4 may wait until a signal that identifies the completion of the actual recipe is entered and no further edition is needed. If the graphical user interface is not operated within the predetermined time period, then the control unit 4 determines that no further edition of the actual recipe is needed.

In Step 10, if the inspector determines the need to further edit the actual recipe, then the inspector operates the graphical user interface to edit the actual recipe.

In Step 11, if the control unit 4 determines that no further edition of the actual recipe is needed, then the control unit 4 stores the actual recipe in the storage unit 5 to complete the sequential processes for preparing the actual recipe based on the plural original recipes.

The operation unit 2 is operated by the inspector to enter instructions to start the actual inspection based on the prepared actual recipe. The operation unit 2 supplies the entered instructions to the control unit 4. Upon receipt of the instructions, the control unit 4 reads out the data of the actual recipe from the storage unit 5, in order to control the micro inspection unit 6, the macro inspection unit 7, the first wafer carrying unit 8 and the cassette loader 9, based on the read data of the actual recipe. Subsequent processes for the actual inspections are the same as described above. Duplicate descriptions of the subsequent processes will be omitted.

In accordance with the second embodiment of the present invention, sequential processes are made automatically by the control unit 4 without receipt of any special instructions, wherein the sequential processes include the above-described processes in Steps 2-8. Namely, the sequential processes in Steps 2-8 are automatically made by the control unit 4. This means an inspector does not have to perform any complex or troublesome operations. This also shortens the time needed for preparing an actual recipe based on the original recipes that have previously been given.

In the first and second embodiments of the present invention, the method and apparatus for inspecting wafers are provided. It will be apparent to a person skilled in the art that the present invention may be applied to other methods and apparatuses for inspecting objects or articles other than wafers, based on the actual recipe that has been prepared by the plural original recipes corresponding to the plural different types of product.

In the first and second embodiments of the present invention, the control unit 4 is configured to perform the function of preparing the actual recipe based on the plural original recipes. It will be apparent that the function of preparing the actual recipe based on the plural original recipes is realized by a functional unit which will be referred to as a recipe preparation unit. The recipe preparation unit may be included in the control unit 4 as described above. It is possible as a modification that the recipe preparation unit is included in an external device such as a host computer that is functionally coupled to the control unit 4 through the communication control unit 3, so that the control unit 4 obtains the actual receipt that has been prepared by the recipe preparation unit included in the external device. In other words, the wafer inspection apparatus may include a device that comprises the recipe preparation unit, or may be functionally coupled to another device that comprises the recipe preparation unit.

As used herein, the term "configured" is used to describe a component, section or part of a device includes hardware and/or software that is constructed and/or programmed to carry out the desired function.

As used herein the term "substrate" means a solid substance on which a device is formed. The term "substrate" may include, but is not limited to, any types of substrates such as semiconductor substrates, insulating substrates, semi-insulating substrates, and conductive substrates, and wafers such as semiconductor wafers. A typical example of the device that is formed on the substrate may include, but is not limited to, semiconductor devices, electron devices and electric devices such as liquid crystal displays.

Moreover, the terms "unit" and "device" as used herein and to be used in the claims should include any structure or configuration that can be utilized to carry out the function of that part of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A substrate inspection apparatus comprising:
    a recipe preparation unit that: (i) obtains a plurality of original recipes which correspond to plural substrate types respectively, the plurality of original recipes corresponding to a plurality of original process units respectively, and (ii) allocates parts of the plurality of original recipes to a group of slots and prepares an actual recipe based on the plurality of original recipes, wherein the group of slots belong to an actual process unit different from the original process units, the group of slots contain substrates of the plural substrate types, at least one of the plural substrate types comprises plural substrates, and the plural substrate types of the plurality of original recipes correspond to the plural substrate types of the substrates contained in the group of slots; and
    a substrate inspection unit that inspects substrates belonging to the actual process unit with reference to the actual recipe.

2. The substrate inspection apparatus according to claim 1, further comprising:
    a storage unit that stores the plurality of original recipes, the storage unit being functionally coupled to the recipe preparation unit, so that the recipe preparation unit reads out the plurality of original recipes from the storage unit.

3. The substrate inspection apparatus according to claim 1, wherein the recipe preparation unit reads out the plurality of original recipes from an external device.

4. The substrate inspection apparatus according to claim 1, wherein the recipe preparation unit allocates the group of slots with a plurality of sampling inspections, the plurality of sampling inspections being defined by the plurality of original recipes respectively, wherein the plurality of sampling inspections correspond to the plural substrate types respectively.

5. The substrate inspection apparatus according to claim 1, wherein if the recipe preparation unit has allocated an empty slot with a part of one of the plurality of original recipes, the recipe preparation unit re-allocates the part of one of the plurality of original recipes to a non-empty slot, which is different from the empty slot and has been allocated with a different part of the one of the plurality of original recipes.

6. The substrate inspection apparatus according to claim 1, wherein the recipe preparation unit allocates the group of slots with the plurality of original recipes, in the sequence of numerical numbers assigned to the group of slots.

7. The substrate inspection apparatus according to claim 1, wherein the recipe preparation unit allocates the group of slots with the plurality of original recipes, so that numerical numbers assigned to the group of slots of the actual recipe correspond to numerical numbers assigned to the group of slots of the plurality of original recipes.

8. The substrate inspection apparatus according to claim 1, wherein the recipe preparation unit recognizes a selected one of a plurality of allocation modes that have previously been given, and the recipe preparation unit automatically allocates the group of slots with parts of the plurality of original recipes in accordance with the selected one of the plurality of allocation modes.

9. The substrate inspection apparatus according to claim 8, wherein if the recipe preparation unit recognizes that the actual recipe does not satisfy at least one inspection condition that has previously been given, the recipe preparation unit re-allocates the actual recipe, so that the actual recipe satisfies the at least one inspection condition.

10. The substrate inspection apparatus according to claim 9, wherein the at least one inspection condition comprises a plurality of predetermined ratios in the number of substrates to be inspected to other substrates not to be inspected, and each of the plurality of predetermined ratios corresponds to one of different types of inspections.

11. The substrate inspection apparatus according to claim 9, wherein the at least one inspection condition comprises a plurality of predetermined minimum numbers of substrates to be inspected, and each of the plurality of predetermined minimum numbers corresponds to one of different types of inspections.

12. A method of inspecting substrates, the method comprising:
    selecting one of a plurality of allocation modes that have previously been given;
    obtaining different types of substrates and a relationship in correspondence between a plurality of slots and the different types of substrates, the plurality of slots comprising sub-pluralities of slots that correspond to the different types of substrates, respectively;
    obtaining a plurality of original recipes that correspond to the different types of substrates, respectively; and
    batch-allocating each of the sub-pluralities of slots with a corresponding one of the plurality of original recipes, so as to prepare an actual recipe based on the plurality of original recipes and to inspect the substrates according to the actual recipe.

* * * * *